(12) United States Patent
Rustad et al.

(10) Patent No.: US 10,291,493 B1
(45) Date of Patent: May 14, 2019

(54) SYSTEM AND METHOD FOR DETERMINING RELEVANT COMPUTER PERFORMANCE EVENTS

(71) Applicant: Dell Software Inc., Aliso Viejo, CA (US)

(72) Inventors: Joseph Rustad, Toronto (CA); Xiangrui Wang, Burlington (CA); Philip Jackson, Asheville, NC (US)

(73) Assignee: Quest Software Inc., Aliso Viejo, CA (US)

( * ) Notice: Subject to any disclaimer, the term of this patent is extended or adjusted under 35 U.S.C. 154(b) by 0 days.

(21) Appl. No.: 14/562,474

(22) Filed: Dec. 5, 2014

(51) Int. Cl.
*G06F 7/00* (2006.01)
*H04L 12/26* (2006.01)

(52) U.S. Cl.
CPC .......... *H04L 43/04* (2013.01); *H04L 43/0823* (2013.01)

(58) Field of Classification Search
CPC ..... H04W 24/02; H04W 24/08; H04W 24/10; H04W 12/08; H04W 4/02; H04W 64/00; H04W 72/0406; H04W 72/085; H04W 84/045; H04L 43/10; H04L 43/12; H04L 41/0803; H04L 41/12; H04L 41/147; H04L 45/02; H04L 47/12; H04L 47/283; H04L 63/101; H04L 63/108; H04L 65/80; H04L 67/22
See application file for complete search history.

(56) References Cited

U.S. PATENT DOCUMENTS

| | | |
|---|---|---|
| 3,701,971 A | 10/1972 | Sanner et al. |
| 3,839,707 A | 10/1974 | Woodward et al. |
| 4,468,728 A | 8/1984 | Wang |
| 4,683,532 A | 7/1987 | Yount et al. |
| 4,937,740 A | 6/1990 | Agarwal et al. |
| 5,103,394 A | 4/1992 | Blasciak |
| 5,321,838 A | 6/1994 | Hensley et al. |

(Continued)

FOREIGN PATENT DOCUMENTS

WO   WO-2013162596 A1   10/2013

OTHER PUBLICATIONS

U.S. Appl. No. 14/249,147, Rustad et al.

(Continued)

*Primary Examiner* — Jeffrey M Rutkowski
*Assistant Examiner* — Jonathan Wood
(74) *Attorney, Agent, or Firm* — Winstead PC

(57) ABSTRACT

In one embodiment, a method includes identifying at least one transaction-path node as a problem node based, at least in part, on an analysis of end-to-end response times for a group of transactions. The method further includes determining one or more event types for the at least one transaction-path node. Also, the method includes, for each of the one or more event types, inferring a first event-relevance weight from an abstract model. The method also includes, for each of the one or more event types, inferring a second event-relevance weight from a concrete model. Furthermore, the method includes, for each of the one or more event types, determining an event relevance based, at least in part, on the first event-relevance weight and the second event-relevance weight. Additionally, the method includes identifying most-relevant events among a set of active events based, at least in part, on the determined event relevance.

20 Claims, 13 Drawing Sheets

(56) References Cited

U.S. PATENT DOCUMENTS

| | | | |
|---|---|---|---|
| 5,375,199 A | 12/1994 | Harrow et al. | |
| 5,432,932 A | 7/1995 | Chen et al. | |
| 5,450,586 A | 9/1995 | Kuzara et al. | |
| 5,493,658 A | 2/1996 | Chiang et al. | |
| 5,506,955 A | 4/1996 | Chen et al. | |
| 5,517,629 A | 5/1996 | Boland | |
| 5,528,753 A | 6/1996 | Fortin | |
| 5,539,907 A | 7/1996 | Srivastava et al. | |
| 5,572,640 A | 11/1996 | Schettler | |
| 5,600,789 A | 2/1997 | Parker et al. | |
| 5,623,598 A | 4/1997 | Voigt et al. | |
| 5,649,187 A | 7/1997 | Hornbuckle | |
| 5,671,351 A | 9/1997 | Wild et al. | |
| 5,673,386 A | 9/1997 | Batra | |
| 5,684,945 A | 11/1997 | Chen et al. | |
| 5,701,137 A | 12/1997 | Kiernan et al. | |
| 5,708,775 A | 1/1998 | Nakamura | |
| 5,715,388 A | 2/1998 | Tsuchihashi | |
| 5,715,415 A | 2/1998 | Dazey et al. | |
| 5,720,018 A | 2/1998 | Muller et al. | |
| 5,740,357 A | 4/1998 | Gardiner et al. | |
| 5,748,881 A | 5/1998 | Lewis et al. | |
| 5,752,062 A | 5/1998 | Gover et al. | |
| 5,768,501 A | 6/1998 | Lewis | |
| 5,872,909 A | 2/1999 | Wilner et al. | |
| 5,881,306 A | 3/1999 | Levine et al. | |
| 5,903,453 A | 5/1999 | Stoddard, II | |
| 5,903,898 A | 5/1999 | Cohen et al. | |
| 5,911,048 A | 6/1999 | Graf | |
| 5,960,425 A | 9/1999 | Buneman et al. | |
| 5,978,594 A | 11/1999 | Bonnell et al. | |
| 5,983,366 A | 11/1999 | King | |
| 5,999,734 A | 12/1999 | Willis et al. | |
| 6,018,567 A | 1/2000 | Dulman | |
| 6,029,170 A | 2/2000 | Garger et al. | |
| 6,035,412 A | 3/2000 | Tamer et al. | |
| 6,128,016 A | 10/2000 | Coelho et al. | |
| 6,148,335 A | 11/2000 | Haggard et al. | |
| 6,173,322 B1 | 1/2001 | Hu | |
| 6,195,092 B1 | 2/2001 | Dhond et al. | |
| 6,199,199 B1 | 3/2001 | Johnston et al. | |
| 6,223,171 B1 | 4/2001 | Chaudhuri et al. | |
| 6,243,105 B1 | 6/2001 | Hoyer et al. | |
| 6,330,008 B1 | 12/2001 | Razdow et al. | |
| 6,351,754 B1 | 2/2002 | Bridge, Jr. et al. | |
| 6,381,628 B1 * | 4/2002 | Hunt | G06F 9/465 709/201 |
| 6,473,791 B1 | 10/2002 | Al-Ghosein et al. | |
| 6,538,669 B1 | 3/2003 | Lagueux, Jr. et al. | |
| 6,543,006 B1 | 4/2003 | Zundel et al. | |
| 6,594,655 B2 | 7/2003 | Tal et al. | |
| 6,622,221 B1 | 9/2003 | Zahavi | |
| RE38,270 E | 10/2003 | Nakajima | |
| 6,633,640 B1 * | 10/2003 | Cohen | H04M 3/5237 379/112.06 |
| 6,654,830 B1 | 11/2003 | Taylor et al. | |
| 6,751,555 B2 | 6/2004 | Poedjono | |
| 6,771,646 B1 | 8/2004 | Sarkissian et al. | |
| 6,833,787 B1 | 12/2004 | Levi | |
| 6,847,970 B2 | 1/2005 | Keller et al. | |
| 6,901,582 B1 | 5/2005 | Harrison | |
| 6,993,454 B1 | 1/2006 | Murstein et al. | |
| 7,010,588 B2 * | 3/2006 | Martin | H04L 41/0213 709/223 |
| 7,103,843 B2 | 9/2006 | Hand et al. | |
| 7,127,324 B2 | 10/2006 | Batori et al. | |
| 7,257,635 B2 | 8/2007 | Chellis et al. | |
| 7,274,375 B1 | 9/2007 | David | |
| 7,363,211 B1 | 4/2008 | Naganathan et al. | |
| 7,370,105 B2 | 5/2008 | Lebourg et al. | |
| 7,389,345 B1 | 6/2008 | Adams | |
| 7,436,822 B2 * | 10/2008 | Lee | H04M 3/2236 370/356 |
| 7,480,647 B1 | 1/2009 | Murstein et al. | |
| 7,480,866 B2 | 1/2009 | Germain et al. | |
| 7,483,978 B2 | 1/2009 | Esfahany et al. | |
| 7,512,888 B2 | 3/2009 | Sugino et al. | |
| 7,523,128 B1 | 4/2009 | Miller et al. | |
| 7,532,642 B1 | 5/2009 | Peacock | |
| 7,557,803 B2 | 7/2009 | Furukawa et al. | |
| 7,558,790 B1 | 7/2009 | Miller et al. | |
| 7,565,610 B2 | 7/2009 | Li et al. | |
| 7,587,492 B2 * | 9/2009 | Dyck | G06F 9/5088 370/229 |
| 7,620,984 B2 | 11/2009 | Kallahalla et al. | |
| 7,644,397 B2 | 1/2010 | Warren et al. | |
| 7,685,251 B2 | 3/2010 | Houlihan et al. | |
| 7,698,683 B1 | 4/2010 | Miller et al. | |
| 7,784,027 B2 * | 8/2010 | Harrison | G06F 11/328 717/113 |
| 7,792,941 B2 | 9/2010 | Fried et al. | |
| 7,822,837 B1 * | 10/2010 | Urban | H04L 12/2602 709/223 |
| 7,882,216 B2 | 2/2011 | Houlihan et al. | |
| 7,917,617 B1 | 3/2011 | Ponnapur et al. | |
| 7,950,026 B1 | 5/2011 | Urbach | |
| 7,962,590 B1 | 6/2011 | Or et al. | |
| 7,979,245 B1 | 7/2011 | Bourlatchkov et al. | |
| 8,051,162 B2 | 11/2011 | Arlitt et al. | |
| 8,051,330 B2 | 11/2011 | Cinato et al. | |
| 8,051,382 B1 | 11/2011 | Kingdom et al. | |
| 8,103,638 B2 | 1/2012 | Voznika et al. | |
| 8,103,826 B2 | 1/2012 | Kobayashi | |
| 8,112,366 B2 | 2/2012 | Hollingsworth et al. | |
| 8,155,996 B1 | 4/2012 | Cassone et al. | |
| 8,161,058 B2 * | 4/2012 | Agarwal | G06F 11/008 707/758 |
| 8,175,862 B1 | 5/2012 | Bourlatchkov et al. | |
| 8,175,863 B1 | 5/2012 | Ostermeyer et al. | |
| 8,181,154 B2 | 5/2012 | Harrison | |
| 8,185,598 B1 | 5/2012 | Golovin et al. | |
| 8,203,972 B2 | 6/2012 | Sauermann | |
| 8,217,945 B1 | 7/2012 | Moscovici | |
| 8,239,526 B2 * | 8/2012 | Simpson | G06F 11/3409 709/224 |
| 8,255,516 B1 | 8/2012 | Zhang et al. | |
| 8,307,337 B2 | 11/2012 | Chamieh et al. | |
| 8,347,273 B2 | 1/2013 | Nageshappa et al. | |
| 8,364,460 B2 | 1/2013 | Ostermeyer et al. | |
| 8,423,646 B2 | 4/2013 | Jamjoom et al. | |
| 8,438,609 B2 | 5/2013 | Cohen et al. | |
| 8,490,055 B2 | 7/2013 | Basak | |
| 8,555,244 B2 | 10/2013 | Harrison | |
| 8,635,498 B2 | 1/2014 | Kahana et al. | |
| 8,712,950 B2 | 4/2014 | Smith et al. | |
| RE44,964 E | 6/2014 | Kymal et al. | |
| 8,819,673 B1 | 8/2014 | Wilkinson et al. | |
| 8,880,678 B1 | 11/2014 | Colton et al. | |
| 8,892,415 B2 * | 11/2014 | Bourlatchkov | G06F 11/3409 703/14 |
| 8,902,248 B1 | 12/2014 | Bidarkar et al. | |
| 8,930,395 B2 | 1/2015 | Sharma et al. | |
| 8,966,036 B1 * | 2/2015 | Asgekar | G06Q 50/01 707/706 |
| 8,966,039 B1 | 2/2015 | Fultz et al. | |
| 9,075,911 B2 | 7/2015 | Mohan et al. | |
| 9,288,147 B2 | 3/2016 | Kern et al. | |
| 9,497,243 B1 * | 11/2016 | Binns | H04L 65/602 |
| 9,557,879 B1 | 1/2017 | Wang et al. | |
| 9,569,179 B1 | 2/2017 | Kachmar et al. | |
| 9,811,365 B2 | 11/2017 | Borthakur | |
| 9,860,139 B2 | 1/2018 | Spracklen et al. | |
| 9,882,969 B2 | 1/2018 | Reddy et al. | |
| 9,998,393 B2 | 6/2018 | Hanis et al. | |
| 10,075,459 B1 | 9/2018 | Suryanarayanan et al. | |
| 2001/0018710 A1 | 8/2001 | Clarke et al. | |
| 2002/0138659 A1 | 9/2002 | Trabaris et al. | |
| 2002/0175941 A1 | 11/2002 | Hand et al. | |
| 2003/0009551 A1 | 1/2003 | Benfield et al. | |
| 2003/0028630 A1 | 2/2003 | Bischof et al. | |
| 2003/0084155 A1 | 5/2003 | Graupner et al. | |
| 2003/0097438 A1 | 5/2003 | Bearden et al. | |
| 2003/0101262 A1 | 5/2003 | Godwin | |
| 2003/0126256 A1 | 7/2003 | Cruickshank et al. | |

(56) References Cited

U.S. PATENT DOCUMENTS

| | | |
|---|---|---|
| 2003/0149753 A1 | 8/2003 | Lamb |
| 2003/0204588 A1 | 10/2003 | Peebles et al. |
| 2003/0225563 A1 | 12/2003 | Gonos |
| 2004/0006763 A1 | 1/2004 | Van De Vanter et al. |
| 2004/0012637 A1 | 1/2004 | Alford et al. |
| 2004/0030592 A1 | 2/2004 | Buck et al. |
| 2004/0039728 A1 | 2/2004 | Fenlon et al. |
| 2004/0046785 A1 | 3/2004 | Keller |
| 2004/0059812 A1 | 3/2004 | Assa |
| 2004/0064293 A1 | 4/2004 | Hamilton et al. |
| 2004/0068560 A1 | 4/2004 | Oulu et al. |
| 2004/0102925 A1 | 5/2004 | Giffords |
| 2004/0147265 A1* | 7/2004 | Kelley .................. G06Q 30/02 455/445 |
| 2005/0021743 A1 | 1/2005 | Fleig et al. |
| 2005/0021748 A1 | 1/2005 | Garcea et al. |
| 2005/0044528 A1 | 2/2005 | Olsen |
| 2005/0060300 A1 | 3/2005 | Stolte et al. |
| 2005/0111352 A1 | 5/2005 | Ho et al. |
| 2005/0187750 A1 | 8/2005 | Satoh et al. |
| 2005/0198649 A1 | 9/2005 | Zakonov |
| 2005/0232227 A1* | 10/2005 | Jorgenson .............. H04L 41/14 370/351 |
| 2006/0002478 A1 | 1/2006 | Seo |
| 2006/0101340 A1 | 5/2006 | Sridhar et al. |
| 2006/0168199 A1 | 7/2006 | Chagoly et al. |
| 2006/0171334 A1 | 8/2006 | Hirata et al. |
| 2006/0173875 A1 | 8/2006 | Stefaniak |
| 2006/0235928 A1 | 10/2006 | Cacenco et al. |
| 2007/0008884 A1 | 1/2007 | Tang |
| 2007/0028239 A1 | 2/2007 | Dyck et al. |
| 2007/0043860 A1 | 2/2007 | Pabari |
| 2007/0087756 A1* | 4/2007 | Hoffberg ........... G06Q 10/0631 455/450 |
| 2007/0226341 A1 | 9/2007 | Mateo |
| 2007/0250525 A1* | 10/2007 | Sanghvi ................. G06F 9/542 |
| 2007/0255805 A1 | 11/2007 | Beams et al. |
| 2007/0255814 A1 | 11/2007 | Green et al. |
| 2008/0016115 A1 | 1/2008 | Bahl et al. |
| 2008/0077366 A1 | 3/2008 | Neuse et al. |
| 2008/0155537 A1 | 6/2008 | Dinda et al. |
| 2008/0162107 A1* | 7/2008 | Aniszczyk ................ G06F 8/61 703/21 |
| 2008/0162387 A1* | 7/2008 | Singh ..................... G06Q 30/02 706/14 |
| 2008/0208888 A1 | 8/2008 | Mitchell |
| 2008/0222633 A1 | 9/2008 | Kami |
| 2008/0263073 A1 | 10/2008 | Ohba et al. |
| 2008/0306711 A1 | 12/2008 | Bansal |
| 2008/0320269 A1 | 12/2008 | Houlihan et al. |
| 2009/0013281 A1 | 1/2009 | Helfman et al. |
| 2009/0083276 A1 | 3/2009 | Barsness et al. |
| 2009/0119301 A1* | 5/2009 | Cherkasova ........... G06Q 10/06 |
| 2009/0147011 A1 | 6/2009 | Buck et al. |
| 2009/0150538 A1 | 6/2009 | Tripathi et al. |
| 2009/0164250 A1 | 6/2009 | Hamilton et al. |
| 2009/0172666 A1 | 7/2009 | Yahalom et al. |
| 2009/0177567 A1 | 7/2009 | McKerlich et al. |
| 2009/0199177 A1 | 8/2009 | Edwards et al. |
| 2009/0204718 A1 | 8/2009 | Lawton et al. |
| 2009/0210527 A1 | 8/2009 | Kawato |
| 2009/0222558 A1 | 9/2009 | Xu et al. |
| 2009/0241108 A1 | 9/2009 | Edwards et al. |
| 2009/0271646 A1 | 10/2009 | Talwar et al. |
| 2009/0300605 A1 | 12/2009 | Edwards et al. |
| 2009/0307597 A1 | 12/2009 | Bakman |
| 2010/0015926 A1 | 1/2010 | Luff |
| 2010/0114554 A1 | 5/2010 | Misra |
| 2010/0125665 A1 | 5/2010 | Simpson et al. |
| 2010/0138744 A1 | 6/2010 | Kamay et al. |
| 2010/0153862 A1 | 6/2010 | Schreiber |
| 2010/0153916 A1 | 6/2010 | Bhatkhande et al. |
| 2010/0190509 A1* | 7/2010 | Davis .................. H04W 56/006 455/456.1 |
| 2010/0223609 A1 | 9/2010 | DeHaan et al. |
| 2010/0229096 A1 | 9/2010 | Maiocco et al. |
| 2010/0241690 A1 | 9/2010 | Kurapati et al. |
| 2010/0250892 A1 | 9/2010 | Logan et al. |
| 2010/0305721 A1 | 12/2010 | Kostadinov et al. |
| 2010/0315958 A1* | 12/2010 | Luo ..................... H04L 12/2602 370/248 |
| 2010/0317420 A1* | 12/2010 | Hoffberg ........... G06Q 30/0207 463/1 |
| 2010/0325273 A1 | 12/2010 | Kudo |
| 2011/0047496 A1 | 2/2011 | Harrison |
| 2011/0066780 A1 | 3/2011 | Bruce et al. |
| 2011/0119748 A1 | 5/2011 | Edwards et al. |
| 2011/0125800 A1* | 5/2011 | Seager ................. H04L 63/0227 707/790 |
| 2011/0145380 A1 | 6/2011 | Glikson et al. |
| 2011/0153724 A1 | 6/2011 | Raja et al. |
| 2011/0161851 A1 | 6/2011 | Barber et al. |
| 2011/0187711 A1 | 8/2011 | Giovinazzi et al. |
| 2011/0197205 A1 | 8/2011 | Wagner et al. |
| 2011/0208827 A1 | 8/2011 | Pitkow et al. |
| 2011/0209146 A1 | 8/2011 | Box et al. |
| 2011/0254704 A1 | 10/2011 | Fournier et al. |
| 2011/0270566 A1 | 11/2011 | Sawada et al. |
| 2011/0298804 A1 | 12/2011 | Hao et al. |
| 2011/0302577 A1 | 12/2011 | Reuther et al. |
| 2012/0005148 A1* | 1/2012 | Horvitz .................. G06N 5/043 706/50 |
| 2012/0011254 A1 | 1/2012 | Jamjoom et al. |
| 2012/0023429 A1 | 1/2012 | Medhi |
| 2012/0029929 A1 | 2/2012 | Schaude et al. |
| 2012/0030346 A1 | 2/2012 | Fukuda et al. |
| 2012/0079497 A1 | 3/2012 | Gangemi et al. |
| 2012/0137367 A1* | 5/2012 | Dupont .................. G06F 21/00 726/25 |
| 2012/0166623 A1 | 6/2012 | Suit |
| 2012/0198073 A1* | 8/2012 | Srikanth ................ G06F 9/5027 709/226 |
| 2012/0221314 A1 | 8/2012 | Bourlatchkov et al. |
| 2012/0222002 A1 | 8/2012 | Harrison |
| 2012/0254395 A1 | 10/2012 | Bonas |
| 2012/0254900 A1 | 10/2012 | Kumar et al. |
| 2012/0271821 A1* | 10/2012 | Qin .................. G06F 17/30687 707/728 |
| 2012/0271937 A1 | 10/2012 | Cotten et al. |
| 2012/0284713 A1 | 11/2012 | Ostermeyer et al. |
| 2013/0066823 A1* | 3/2013 | Sweeney .................. G06N 5/02 706/50 |
| 2013/0080641 A1 | 3/2013 | Lui et al. |
| 2013/0097580 A1* | 4/2013 | Meijer ..................... G06F 8/76 717/104 |
| 2013/0159115 A1* | 6/2013 | Adams ................... G06Q 50/01 705/14.66 |
| 2013/0159999 A1 | 6/2013 | Chiueh et al. |
| 2013/0174127 A1 | 7/2013 | Chen et al. |
| 2013/0185433 A1 | 7/2013 | Zhu et al. |
| 2013/0211905 A1* | 8/2013 | Qin ..................... G06Q 30/0242 705/14.41 |
| 2013/0212285 A1* | 8/2013 | Hoffmann ........... H04L 12/4641 709/226 |
| 2013/0218547 A1* | 8/2013 | Ostermeyer ........ G06F 17/5009 703/13 |
| 2013/0253718 A1 | 9/2013 | Meagher et al. |
| 2013/0262915 A1 | 10/2013 | Frank et al. |
| 2013/0331963 A1 | 12/2013 | Ahangar et al. |
| 2014/0006580 A1 | 1/2014 | Raghu |
| 2014/0013315 A1 | 1/2014 | Genevski et al. |
| 2014/0052712 A1* | 2/2014 | Savage ............. G06F 17/30707 707/722 |
| 2014/0079297 A1* | 3/2014 | Tadayon ................... G06K 9/00 382/118 |
| 2014/0082612 A1 | 3/2014 | Breitgand et al. |
| 2014/0089901 A1 | 3/2014 | Hadar |
| 2014/0092722 A1* | 4/2014 | Jain ........................ H04L 45/22 370/217 |
| 2014/0108647 A1 | 4/2014 | Bleess et al. |
| 2014/0115164 A1 | 4/2014 | Kalyanaraman et al. |
| 2014/0165054 A1 | 6/2014 | Wang et al. |

(56) References Cited

U.S. PATENT DOCUMENTS

| | | | |
|---|---|---|---|
| 2014/0165063 A1 | 6/2014 | Shiva et al. | |
| 2014/0229934 A1 | 8/2014 | Larkin et al. | |
| 2014/0258872 A1 | 9/2014 | Spracklen et al. | |
| 2014/0269691 A1* | 9/2014 | Xue | H04L 45/125 370/389 |
| 2014/0279838 A1 | 9/2014 | Tsirogiannis et al. | |
| 2014/0304407 A1* | 10/2014 | Moon | H04L 43/045 709/224 |
| 2014/0310813 A1 | 10/2014 | Murthy | |
| 2014/0317261 A1 | 10/2014 | Shatzkamer et al. | |
| 2014/0317293 A1 | 10/2014 | Shatzkamer | |
| 2014/0337500 A1 | 11/2014 | Lee | |
| 2014/0350888 A1* | 11/2014 | Gesmann | G06F 11/30 702/183 |
| 2014/0365196 A1 | 12/2014 | Melander et al. | |
| 2014/0372230 A1* | 12/2014 | Ray | G06Q 30/0242 705/14.71 |
| 2015/0032436 A1 | 1/2015 | van de Kamp | |
| 2015/0032437 A1* | 1/2015 | Kumar | G06F 17/5022 703/14 |
| 2015/0046212 A1 | 2/2015 | Mos | |
| 2015/0052250 A1* | 2/2015 | Doganata | H04L 47/78 709/226 |
| 2015/0089483 A1 | 3/2015 | Guthridge | |
| 2015/0127415 A1* | 5/2015 | Showalter | G06Q 10/0635 705/7.28 |
| 2015/0127815 A1 | 5/2015 | Billore et al. | |
| 2015/0134589 A1 | 5/2015 | Marrelli et al. | |
| 2015/0142457 A1* | 5/2015 | Marshall | G06F 19/3437 705/2 |
| 2015/0199207 A1 | 7/2015 | Lin et al. | |
| 2015/0358391 A1* | 12/2015 | Moon | H04L 67/10 709/224 |
| 2016/0011894 A1 | 1/2016 | Reddy et al. | |
| 2016/0035114 A1 | 2/2016 | Hesse et al. | |
| 2016/0042296 A1* | 2/2016 | Shan | G06N 99/005 706/11 |
| 2016/0048408 A1 | 2/2016 | Madhu et al. | |
| 2016/0094401 A1 | 3/2016 | Anwar et al. | |
| 2016/0147522 A1 | 5/2016 | Dimitrakos et al. | |
| 2016/0191345 A1 | 6/2016 | Despotovic et al. | |
| 2016/0254965 A1 | 9/2016 | Maes | |
| 2016/0274948 A1 | 9/2016 | Kelly et al. | |
| 2016/0291942 A1 | 10/2016 | Hutchison | |
| 2016/0359872 A1 | 12/2016 | Yadav et al. | |

OTHER PUBLICATIONS

U.S. Appl. No. 14/292,135, Rustad.
Layered Technologies, Inc., "Optimized Application Performance and User Experience: Application Performance Management Service," 2013, 4 pages.
Levey, Tom, "Monitoring the Real End User Experience," www.appdynamics.com, Jul. 25, 2013, 7 pages.
Quarles, John et al.; "A Mixed Reality Approach for Merging Abstract and Concrete Knowledge"; IEEE Virtual Reality 2008; Mar. 8-12, 2008; pp. 27-34.
U.S. Appl. No. 13/745,677, Ostermeyer.
U.S. Appl. No. 13/658,709, Wang et al.
U.S. Appl. No. 13/658,724, Wang et al.
U.S. Appl. No. 14/725,778, Chen et al.
U.S. Appl. No. 14/607,776, Qin et al.
U.S. Appl. No. 14/607,907, Qin et al.
U.S. Appl. No. 14/858,341, Qin et al.
Template Software, Workflow Template Process Template, "Developing a WFT Workflow System", 1997, whole manual.
Partridge C. et al. FIRE State Message Protocol Specification, BBN Technologies, Jul. 12, 2000, (pp. 1-19).
NEWRELICBLOG, "Platform as a Service Meets SaaS Application Performance Management"; http://blog.newrelic.com/2011/01/13/platform-as-a-service-meets-saas-application-performance-management/; Jan. 13, 2011; 3 pages.
Quest Software, Inc.; "Instance Monitor"; Brochure, Quest Software, Inc.; 1999; 2 pages.
Boucher, Karen et al.; "Essential Guide to Object Monitors"; Mar. 1999; 263 pages (whole book).
Dewan, Prasun et al.; "A High-Level and Flexible Framework for Implementing Multiuser User Interfaces"; 1992; pp. 345-380.
Distributed Management Task Force, Inc. (DMTF); "Common Information Model (CIM) Infrastructure Specification"; Version 2.3 Final; Oct. 4, 2005; 102 pages.
Harrison, Guy; "Oracle SQL High-Performance Tuning"; ("Building a High-Performance Oracle Database Server" and "Tuning the Database Server"); Prentice-Hall, NJ; 1997; pp. 363-364 and 399-400.
Hitachi, Ltd et al.; "Hitachi TPBroker User's Guide: Release 3.1"; Sep. 28, 1998; 311 pages (entire manual).
Laessig, Dirk; "Score Big with JSR 77, the J2EE Management Specification"; Javaworld; Jun. 14, 2002; 8 pages.
Muller, Nathan J.; "Focus on HP OpenView: A Guide to Hewlett-Packard's Network and Systems Management Platform"; CBM Books; 1995; 304 pages (entire book).
Savant Corporation; "Products"; http://www.savant-corp.com/prods.html, downloaded on Nov. 16, 1999; 1 page.
Savant Corporation; "Products"; http://www.savant-corp.com/prods.html, downloaded on Feb. 15, 2000; 1 page.
Savant Corporation; "Q Application Diagnostics"; http://www.savant-corp.com/qappd.html, downloaded on Nov. 16, 1999; 1 page.
Savant Corporation; "Q Hot SQL"; http://www.savant-corp.com/qhsql.html, downloaded on Nov. 16, 1999; 1 page.
Savant Corporation; "Q Instance Overview"; http://www.savant-corp.com/qiov.html, downloaded on Nov. 16, 1999; 1 page.
Savant Corporation; "Q Job Queue Manager"; http://www.savant-corp.com/qjobq.html, downloaded on Nov. 16, 1999; 1 page.
Savant Corporation; "Q Lock Manager"; http://www.savant-corp.com/qlock.html, downloaded on Nov. 16, 1999; 1 page.
Savant Corporation; "Q Replay Viewer"; http://www.savant-corp.com/qreplay.html, downloaded on Nov. 16, 1999; 1 page.
Singh, Inderjeet et al.; "Designing Web Services with J2EE 1.4 Platform JAX-RPC, SOAP, and XML Technologies"; Chapter 6 (pp. 247-289); May 2004; 46 pages.
Tang, Steven H. et al.; "Blending Structured Graphics and Layout"; ACM; Nov. 1994; pp. 167-174.
Wikimedia Foundation, Inc.; "Network Functions Virtualization"; http://en.wikipedia.org/wiki/Network_Functions_Virtualization; last modified Mar. 17, 2015; 6 pages.
NEO4J; "Network Dependency Graph"; http://www.neo4j.org/graphgist?github-neo4J . . . ; Jun. 18, 2014; 9 pages.
BMC Software, Inc.; "BMC Atrium Discovery and Dependency Mapping"; http://documents.bmc.com/products/documents/18/60/451860/451860.pdf ; 2014; 2 pages.
Grisby, Duncan; "The Power behind BMC Atrium Discovery and Dependency Mapping"; http://documents.bmc.com/products/documents/18/97/451897/451897.pdf; 2014; 5 pages.
Hewlett-Packard Development Company, L.P.; "Data Sheet: HP Universal Discovery Software"; http://h20195.www2.hp.com/V2/GetPDF.aspx/4AA4-1812ENW.pdf; Sep. 2014; 8 pages.
Quest Software, Inc.; "Foglight 5.6.4: Managing Dependency Mapping User Guide"; 2012; 62 pages.
Quest Software, Inc.; "Foglight 5.6.2: Managing the Dependency Mapping User Guide"; 2011; 55 pages.
Quest Software, Inc.; "Foglight APM: An Adaptive Architecture for All Environments"; 2011; 25 pages.
vFoglight Alarms: Overview—Demo 6; 2009; 31 pages.
Quest Software, Inc.; "Foglight 5.5.8: Managing Dependency Mapping User Guide"; 2011; 53 pages.
Cappelli, Will; "APM Needs Three-Layered Application Materials"; Gartner Research; Feb. 26, 2010; 5 pages.
Microsoft; "What is System Center Advisor?"; http://onlinehelp.microsoft.com/en-us/advisor/ff962512(printer).aspx; accessed on Apr. 5, 2011; 2 pages.
Microsoft; "Microsoft System Center Advisor"; https://www.systemcenteradvisor.com/; accessed on Apr. 4, 2011; 1 page.
Microsoft; "Windows Management Instrumentation (WMI): Frequently Asked Questions: Troubleshooting and Tips"; http://technet.

(56) References Cited

OTHER PUBLICATIONS microsoft.com/en-us/library/ee692772(d=printer).aspx; Microsoft TechNet; Jul. 28, 2004; 20 pages.

Maston, Michael; "Managing Windows with WMI"; http://technet.microsoft.com/en-us/library/bb742445(d=printer).aspx; Nov. 1, 1999; 11 pages.

Aternity, Inc., "Aternity Virtual Desktop Monitoring: Get Visibility into all Tiers of the Virtual Desktop," http://www.aternity.com/products/workforce-apm/virtual-desktop-monitoring/, May 11, 2014, 2 pages.

Solarwinds Worldwide. LLC., "SolarWinds: Virtualization Manager Administrator Guide," DocVersion 6.3.0.1, Sep. 8, 2015, 321 pages.

EG Innovations, Inc., "eG Enterprise Performance Monitoring for Citrix XenDesktop: Performance Assurance for Citrix Virtual Desktops," www.eginnovations.com, accessed on Sep. 17, 2015, 2 pages.

EG Innovations, Inc., "Service Overview: VDI Performance Assessment: Move VDI Deployments from Test to Best," www.eginnovations.com, accessed on Sep. 17, 2015, 2 pages.

EG Innovations, Inc., "Total Performance Monitoring for Citrix XenApp and XenDesktop," www.eginnovations.com, accessed on Sep. 17, 2015, 2 pages.

Goliath Technologies, "Goliath Performance Monitor: for Citrix XenApp & XenDesktop," http://goliathtechnologies.com, May 2014, 2 pages.

Goliath Technologies, "Goliath Performance Monitor: for VMware," http://goliathtechnologies.com, May 2014, 2 pages.

VMTURBO, "VDI Control Module," http://vmturbo.com, Nov. 2014, 2 pages.

VMTURBO, "VMTurbo Operations Manager: Demand-Driven Control for Cloud and Virtualization," http://vmturbo.com, Jun. 2015, 2 pages.

U.S. Appl. No. 14/619,897, Diep et al.

U.S. Appl. No. 15/201,655, Qin et al.

U.S. Appl. No. 15/201,657, Qin et al.

Wood, Timothy, et al.; Middleware 2008; "Profiling and Modeling Resource Usage of Virtualized Applications"; vol. 5346 of the series Lecture Notes in Computer Science; Dec. 2008; pp. 366-387.

Liquidware Labs; "Performance Validation and Optimization"; http://www.liquidwarelabs.com/products/stratusphere-ux/performance-validation-optimization; Oct. 1, 2015; 2 pages.

Dell, Inc.; "Monitoring with User Dashboards"; vWorkspace Monitoring and Diagnostics 5.5.5—User's Guide; http://documents.software.dell.com/vworkspace-monitoring-and-diagnostics/5.6.5/users-guide/users-guide/working-with-foglight-for-virtual-desktops/monitoring-with-user-dashboards?ParentProduct=687; last revised on May 23, 2013; 4 pages.

Agrawal, Banit, et al.; "VMware View® Planner: Measuring True Virtual Desktop Experience at Scale"; VMWare Technical Journal (VMTJ), Winter 2012; Dec. 2012; pp. 69-79.

Spracklen, Lawrence, et al.; "Comprehensive User Experience Monitoring"; VMWare Technical Journal (VMTJ), Spring 2012; Mar. 2012; pp. 22-31.

\* cited by examiner

Top Correlations

Poor Performance

| | | |
|---|---|---|
| 🄰 Internet Explorer | ▨▨▨▨▨ | +25 % |
| 🄰 Firefox | ▨▨▨ | +18 % |
| ⇌ resetPassword.do | ▨▨ | +11 % |
| ⇌ finalizeBilling.do | ▨ | +9 % |
| ⇌ register_user.do | ▨ | +6 % |
| 🌐 Atlanta. Georgia | ▨ | +5 % |

>See All Poor Performance

Errors

| | | |
|---|---|---|
| ⊚ Paypal | ▦▦▦▦▦▦ | +50 % |
| 🄰 Safari Mobile | ▦▦▦▦▦ | +42 % |
| 🌐 Canada | ▦▦▦▦▦ | +39 % |
| ⇌ download_driver | ▦▦▦▦ | +33 % |
| 🌐 United States | ▦▦▦ | +25 % |
| 🌐 Miami, Florida | ▦▦ | +18 % |

>See All Errors

SYSTEM AND METHOD FOR DETERMINING RELEVANT COMPUTER PERFORMANCE EVENTS

BACKGROUND

Technical Field

The present disclosure relates generally to data analysis and more particularly, but not by way of limitation, to systems and methods for determining relevant computer performance events.

History of Related Art

Modern web applications process millions of transactions per day and can include multiple redundant layers. When a problem occurs, it can be difficult to trace the problem to a cause. Typical reports and alerts regarding transactions are complex and do not adequately indicate a root cause of poor-performing transactions.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes identifying at least one transaction-path node as a problem node based, at least in part, on an analysis of end-to-end response times for a group of transactions. The method further includes determining one or more event types for the at least one transaction-path node. In addition, the method includes, for each of the one or more event types, inferring a first event-relevance weight from an abstract model. The abstract model includes a first probabilistic graphical model that represents a set of monitored-resource types and a probabilistic relevance of the monitored-resources types to a plurality of event types, the set of monitored-resource types comprising a monitored-resource type of the at least one transaction-path node, the plurality of event types comprising the one or more event types. The method also includes, for each of the one or more event types, inferring a second event-relevance weight from a concrete model. The concrete model includes a second probabilistic graphical model that represents a real-time topology of monitored resources and a probabilistic relevance of the monitored resources to the plurality of event types such that the monitored resources are instances of the monitored-resource types, the monitored resources comprising the at least one transaction path node. Furthermore, the method includes, for each of the one or more event types, determining an event relevance based, at least in part, on the first event-relevance weight and the second event-relevance weight. Additionally, the method includes identifying most-relevant events among a set of active events based, at least in part, on the determined event relevance.

In one embodiment, an information handling system includes at least one processor, wherein the at least one processor is operable to implement a method. The method includes identifying at least one transaction-path node as a problem node based, at least in part, on an analysis of end-to-end response times for a group of transactions. The method further includes determining one or more event types for the at least one transaction-path node. In addition, the method includes, for each of the one or more event types, inferring a first event-relevance weight from an abstract model. The abstract model includes a first probabilistic graphical model that represents a set of monitored-resource types and a probabilistic relevance of the monitored-resources types to a plurality of event types, the set of monitored-resource types comprising a monitored-resource type of the at least one transaction-path node, the plurality of event types comprising the one or more event types. The method also includes, for each of the one or more event types, inferring a second event-relevance weight from a concrete model. The concrete model includes a second probabilistic graphical model that represents a real-time topology of monitored resources and a probabilistic relevance of the monitored resources to the plurality of event types such that the monitored resources are instances of the monitored-resource types, the monitored resources comprising the at least one transaction path node. Furthermore, the method includes, for each of the one or more event types, determining an event relevance based, at least in part, on the first event-relevance weight and the second event-relevance weight. Additionally, the method includes identifying most-relevant events among a set of active events based, at least in part, on the determined event relevance.

In one embodiment, a computer-program product includes a non-transitory computer-usable medium having computer-readable program code embodied therein. The method includes identifying at least one transaction-path node as a problem node based, at least in part, on an analysis of end-to-end response times for a group of transactions. The method further includes determining one or more event types for the at least one transaction-path node. In addition, the method includes, for each of the one or more event types, inferring a first event-relevance weight from an abstract model. The abstract model includes a first probabilistic graphical model that represents a set of monitored-resource types and a probabilistic relevance of the monitored-re-sources types to a plurality of event types, the set of monitored-resource types comprising a monitored-resource type of the at least one transaction-path node, the plurality of event types comprising the one or more event types. The method also includes, for each of the one or more event types, inferring a second event-relevance weight from a concrete model. The concrete model includes a second probabilistic graphical model that represents a real-time topology of monitored resources and a probabilistic relevance of the monitored resources to the plurality of event types such that the monitored resources are instances of the monitored-resource types, the monitored resources comprising the at least one transaction path node. Furthermore, the method includes, for each of the one or more event types, determining an event relevance based, at least in part, on the first event-relevance weight and the second event-relevance weight. Additionally, the method includes identifying most-relevant events among a set of active events based, at least in part, on the determined event relevance.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
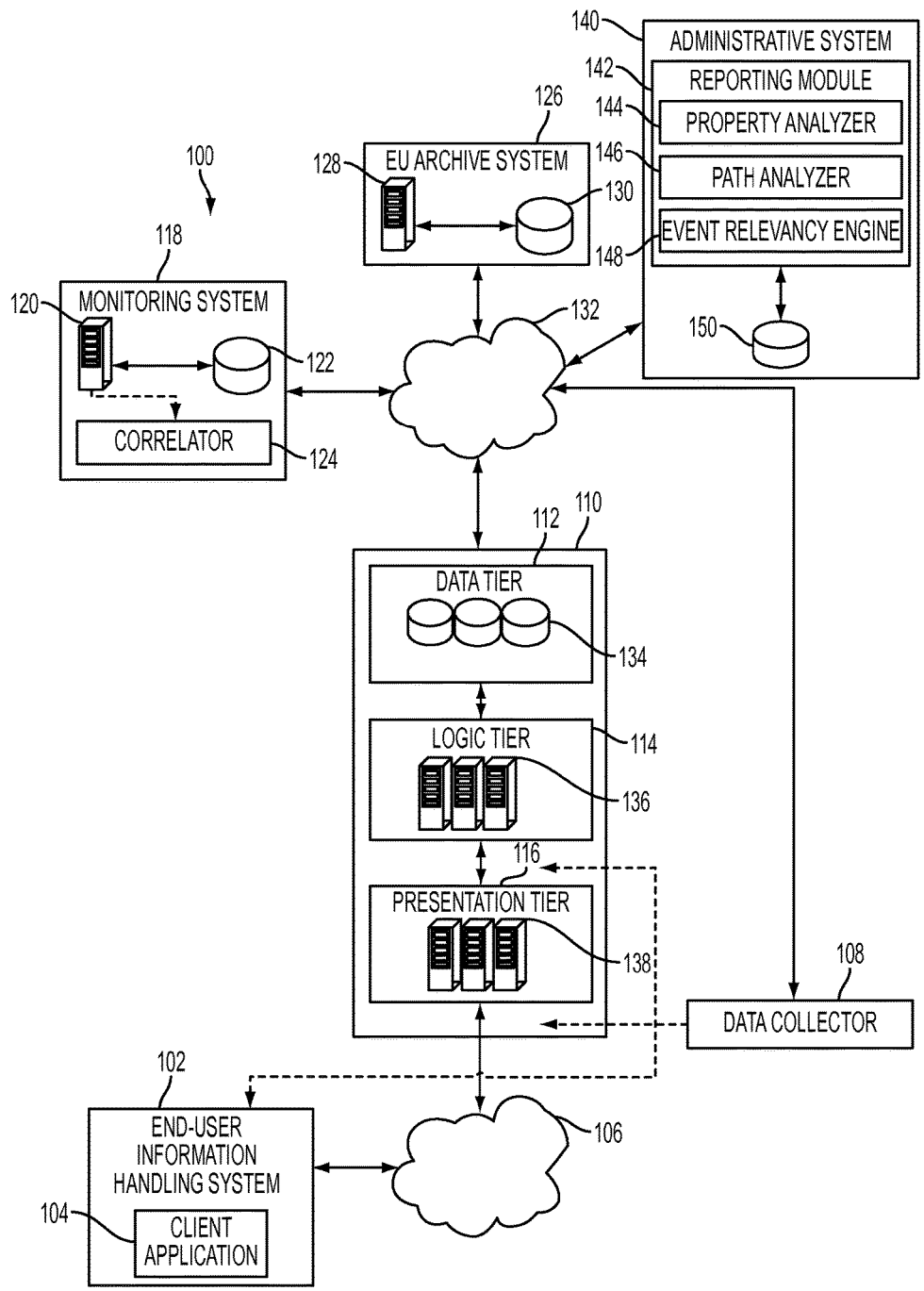
FIG. 1 illustrates a system for generating and performing analysis of end-to-end response times.

In various embodiments, a performance-monitoring system can track and trace end-user (EU) transactions. The performance-monitoring system can produce and store, for example, an end-to-end (E2E) response time for each EU transaction. An EU transaction, as used herein, is initiated by an EU request such as, for example, a web request, includes subsequent processing of the request by a backend-computing system, and is concluded by a web response from the backend-computing system. EU transactions can cross multiple nodes such as, for example, a web browser, a web server, an application server, a database, one or more external services, etc. An E2E response time can include, for example, a time elapsed from initiation through conclusion of an EU transaction.

One way to troubleshoot slow transaction performance is to aggregate E2E response times for a group of EU transactions and examine execution times at each node in an E2E transaction path. An E2E transaction path typically includes a set of nodes through which a given transaction passes. The E2E transaction path can be, for example, application-specific (e.g., web-application-specific). An E2E response time is typically made up of an execution time at each node in the E2E transaction path. Consider an example E2E transaction path that includes a web browser, a network, a web server, an application server, and a database. Each E2E response time can be composed of execution times at each of the web browser, the network, the web server, the application server, and the database. For purposes of troubleshooting, execution times for a group of EU transactions can be aggregated, for example, by determining a mean, median, or mode, performing a statistical analysis, etc. From this information, it can be determined where transactions generally spend the most time. Manual root-cause analysis can subsequently occur.

A downside of the above-mentioned approach is that significant performance aberrations may become diluted in the aggregations. For example, it may be that each poor-performing transaction spends an excessively long period of time at the application server. However, until the poor-performing transactions become abundant in number, the aggregate execution times at the application server may not be indicative of a major problem and thus may not be useful in performing a root-cause analysis. In addition, it may not be immediately apparent what constitutes an excessively long execution time or to what degree a given execution time is excessive.

Another way to troubleshoot slow transaction performance is to analyze aggregate statistics such as, for example, error percentages or response times, for transactions that have a particular transaction property. For example, it may be calculated that ninety percent of slow-performing transactions result from New York City web traffic. A downside of this approach is that such aggregate statistics do not adequately account for the prevalence of the particular transaction property being analyzed. For instance, continuing the above example, if ninety percent of EU transactions result from New York City web traffic, it may not be notable that ninety percent of slow-performing transactions result from New York City web traffic. Conversely, if only two percent of EU transactions result from New York City web traffic, the fact that ninety percent of all slow-performing transactions result from New York City web traffic may be much more significant.

Various embodiments described herein can facilitate a comparative performance analysis of transaction properties for a set of EU transactions. In certain embodiments, transaction properties for a set of EU transactions can be aggregated and analyzed. In particular, an overall prevalence of each transaction property can be compared to a prevalence of the transaction property in a subset of EU transactions that are associated with a particular outcome such as, for example, acceptable, unacceptable, error (e.g., indicating that the EU transaction resulted in particular error), and/or the like. Based on this comparison, certain transaction properties can be determined to be correlation factors for the particular outcome.

In general, a transaction property can be any identifiable characteristic of an EU transaction. For a given EU transaction, examples of transaction properties include a particular web browser (e.g., MICROSOFT INTERNET EXPLORER, APPLE SAFARI, GOOGLE CHROME, MOZILLA FIREFOX, etc.), a particular transaction type (e.g., log-in, checkout, etc.), a geographic location (e.g., city, state, province, country, etc.), each method, function, or subroutine called during execution of the EU transaction, each database statement executed, a screen resolution or size, and/or the like. In general, each node of an E2E transaction path can also be a transaction property. It should be appreciated that some transaction characteristics such as a geographic location can include multiple layers of specificity such that each layer is a distinct transaction property.

For example, for an EU transaction originating in Atlanta, Ga., Atlanta, Ga., and United States may be distinct transaction properties for the EU transaction. Other examples of transaction properties will be apparent to one skilled in the art after reviewing the present disclosure.

In various embodiments, transaction properties can result from any element of backend-performance data and/or EU-experience data. Backend-performance data, as used herein, refers to data collected during runtime of a software application such as, for example, a web application, through instrumentation of the software application. EU-experience data, as used herein, refers to data collected through observation of one or more transactions from an EU perspective. For example, in various embodiments, the EU perspective may be a node between a web server and an EU information handling system, a node between a web server and an application server, or the EU information handling system.

In general, an outcome of an EU transaction is an assessment of a quality of the EU transaction as measured by performance. For example, in some embodiments, an outcome can indicate whether the EU transaction is an acceptable EU transaction or an unacceptable EU transaction, whether the EU transaction resulted in an error, etc. In other embodiments, an outcome can include other assessments such as good, fair, poor, error, high value, low value, and spam. In certain embodiments, each EU transaction can be associated with either an acceptable category or an unacceptable category based, at least in part, on whether an E2E response time exceeds a configurable threshold. The configurable threshold can be an absolute value (e.g., defined in seconds), a relative value (e.g., defined relative to a mean or median value for a transaction type), and/or the like. The configurable threshold can also be varied by type of transaction (e.g., log-in, checkout, etc.).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

I. Example System for Analyzing E2E Response Times

FIG. 1 illustrates a system 100 for generating and performing analysis of E2E response times. The system 100 includes at least one EU information handling system 102 communicating with a backend-computing system 110 over a network 106. The at least one EU information handling system 102 has a client application 104 such as, for example, a web-browser application, resident and executing thereon.

The network 106 may include, for example, a public intranet, a private intranet, and/or the Internet. The system 100 further includes a monitoring system 118, an EU archive system 126, and an administrative system 140. The backend-computing system 110, the monitoring system 118, and the EU archive system 126 are operable to communicate over a network 132. Like the network 106, the network 132 may be representative, for example, of a public or private intranet or the Internet. In addition, the system 100 includes a data collector 108.

For illustrative purposes, the backend-computing system 110 is shown to utilize a three-tier architecture that includes a presentation tier 116, a logic tier 114, and a data tier 112. The presentation tier 116 includes at least one information server 138 such as, for example, a web server, that serves content to be rendered by the client application 104. The logic tier 114 includes at least one application server 136 that operates a platform based on, for example, Java EE, ASP-.NET, PHP, ColdFusion, Perl, and/or the like. The data tier 112 includes at least one database 134 that further includes, for example, data sets and a database management system that manages and provides access to the data sets.

It should be appreciated that, in various embodiments, the backend-computing system 110 may include any number of tiers. In addition, in various embodiments, the backend-computing system 110 may implement various alternative architectures such as, for example, a model-view-controller architecture. It should also be appreciated that the at least one application server 136 and the at least one information server 138 are shown separately in FIG. 1 only for purposes of illustrating logically-related functionality. In various embodiments, the at least one application server 136 and the at least one information server 138 are combined into a single server that functions as web server and application server.

The backend-computing system 110 executes one or more distributed software applications such as, for example, a web application, from which backend-performance data is collected. In a typical embodiment, the one or more distributed software applications have been instrumented to provide the backend-performance data. Each of the one or more distributed software applications may be, for example, a collection of software components or services that make up an application stack. In various embodiments, the backend-computing system 110 may use an agent resident thereon to collect the backend-performance data.

The backend-performance data can include, for example, metrics related to infrastructure components (virtual or physical) such as, for example, the at least one database 134, the at least one application server 136, and the at least information server 138. The backend-performance data can also include aggregated metrics related to infrastructure tiers such as, for example, the presentation tier 116, the logic tier 114, and the data tier 112. In addition, the backend-performance data can include metrics related to the application stack for each of the one or more distributed software applications. In a typical embodiment, the backend-performance data can trace EU transactions through a topology of nodes that can include, for example, infrastructure components, infrastructure tiers, and/or application-stack components as described above. Metrics can include, for example, execution time at each tier or by each component or node. Examples of how backend-performance data can collected and managed is described in detail in U.S. Pat. Nos. 7,979, 245 and 8,175,863, each of which is hereby incorporated by reference.

The data collector 108 is a software component that collects the EU-experience data for the at least one EU information handling system 102. In a typical embodiment, the data collector 108 is situated in the system 100 such that the data collector 108 is capable of seeing all network traffic (i.e., all packets exchanged) between the at least one EU information handling system 102 and the backend-computing system 110. In this fashion, the data collector 108 functions as a packet analyzer and is operable to extract the EU-experience data and transmit the EU-experience data to the EU archive system 126. The EU archive system 126 includes at least one server computer 128 and at least one database 130. The EU archive system 126 receives the EU-experience data from the data collector 108 and stores the EU-experience data in the at least one database 130. An example of how EU-experience data can be collected is described in U.S. Pat. No. 7,941,385. U.S. Pat. No. 7,941, 385 is hereby incorporated by reference.

As illustrated, the data collector 108 can reside at various nodes in the system 100. For example, the data collector 108 can reside on the backend-computing system 110 between the presentation tier 116 and the logic tier 114. The data collector 108 can also be resident on the backend-computing system 110 between the presentation tier 116 and the network 106. In addition, in various embodiments, the data collector 108 is representative of client-side scripting that is executed on the at least one EU information handling system 102. In this fashion, the data collector 108 can also be resident on the at least one EU information handling system 102. It should be appreciated that other locations for the data collector 108 such as, for example, within the presentation tier 116, are also contemplated.

The monitoring system 118 includes at least one server computer 120 and at least one database 122. The at least one server computer 120 is operable to execute a correlator 124. The correlator 124 is typically a software component that correlates the EU-experience data maintained by the EU archive system 126 with the backend-performance data maintained by the monitoring system 118 to yield E2E response times for EU transactions. In many cases, the monitoring system 118, the at least one server computer 120, and/or the at least one database 122 can be or be implemented on information handling systems. Example operation of the system 100 will be described with respect to FIG. 2.

In addition, in certain embodiments, the monitoring system 118 is operable to detect or identify events. An event can be a performance event related, for example, to the EU-experience data and/or the backend-performance data. For example, an event can be an indication that certain resource characteristics in the backend-computing system 110 are outside of established performance criteria. The characteristics can include, for example, availability, CPU utilization, errors, and/or other factors of interest. In certain embodiments, events may correspond to alarms indicative that one or more such characteristics have reached a defined threshold. By way of further example, an event can be a detected occurrence or action that deviates from what is expected and/or that merits special handling.

The administrative system 140 includes a reporting module 142. The administrative system 140 can include any number of server computers and/or databases. The reporting module 142 can include hardware and/or software for generating and/or presenting alerts, reports, and/or the like based on data stored or generated by the monitoring system 118 and the EU archive system 126. The reports and/or alerts can be served to an administrative user using, for example, an information handling system similar to the EU information handling system 102. For example, in certain embodiments, the reporting module 142 can facilitate a comparative performance analysis between acceptable EU transactions and unacceptable EU transactions.

In particular, the reporting module 142 is shown to include a property analyzer 144, a transaction path analyzer 146, and an event relevancy engine 148. Example functionality of the property analyze 144 will be described with respect to FIGS. 4-5. Example functionality of the transaction path analyzer 146 will be described with respect to FIGS. 6-8. Example functionality of the event relevancy engine 148 will be described with respect to FIGS. 9-13.

One of ordinary skill in the art will appreciate that each instance of a computer or computer system as described above may be representative of any number of physical or virtual server computers. Likewise, each instance of a database may be representative of a plurality of databases. In addition, it should be appreciated that, in various embodiments, each instance of a network such as, for example, the network 106 or the network 132, can be viewed as an abstraction of multiple distinct networks. For example, the network 106 and the network 132 can each include one or multiple communications networks such as, for example, public or private intranets, a public switch telephone network (PSTN), a cellular network, the Internet, or the like. In addition, in various embodiments, the network 106 and the network 132 may overlap or refer to a same network.

Figure 2:
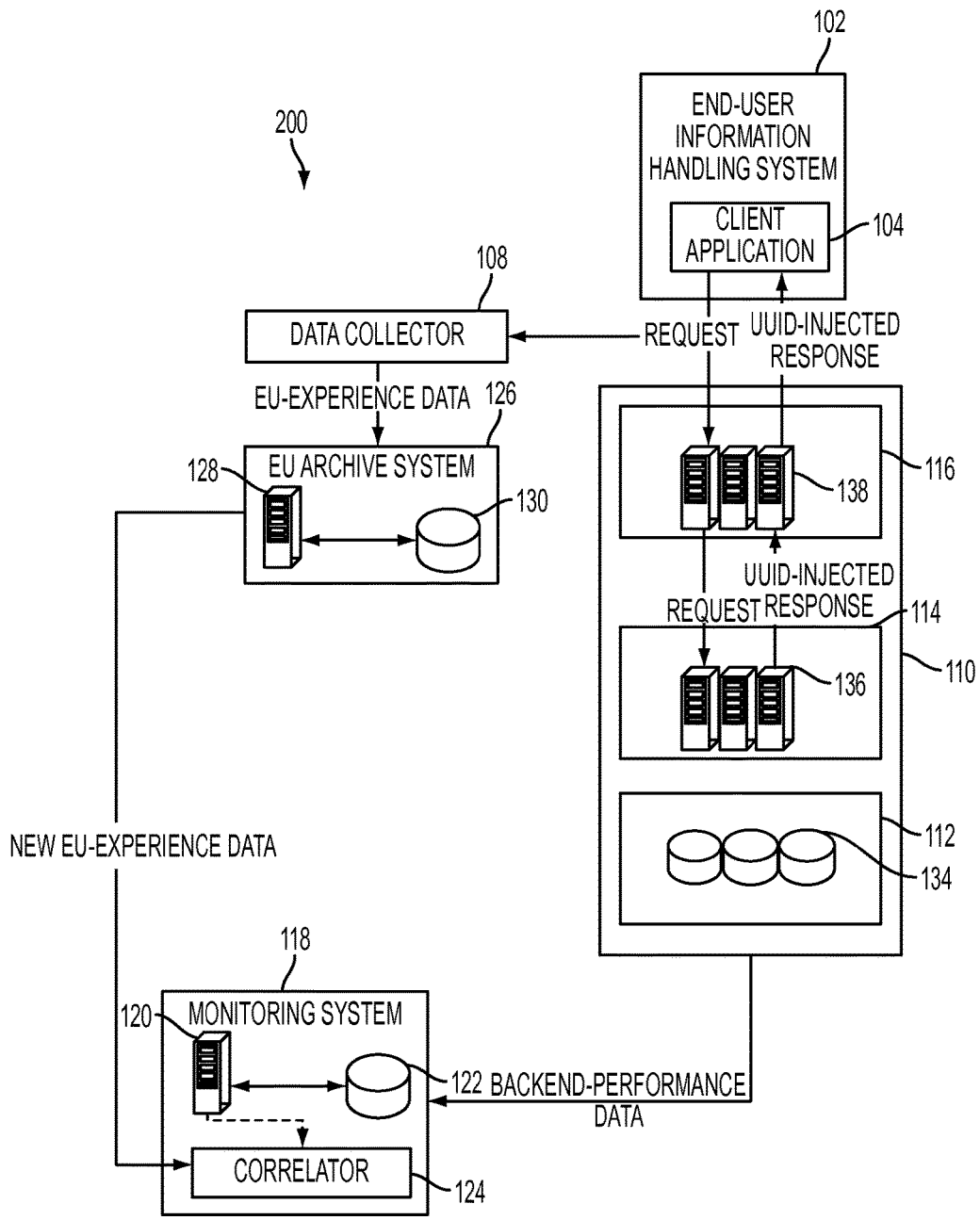
FIG. 2 illustrates an example data flow using the system of FIG. 1.

FIG. 2 illustrates an example data flow 200 using the system 100 of FIG. 1. The EU information handling system 102 initiates a transaction by directing a request such as, for example, an HTTP request, to the at least one information server 138 of the presentation tier 116. The at least information server 138 forwards the request to an appropriate application server, i.e., the at least one application server 136, for handling. The at least one application server 136 generates an identifier (e.g., a UUID) for the transaction. In a typical embodiment, the backend-computing system 110 uses the identifier to identify backend-performance data collected during processing of the transaction, which data is stored by the monitoring system 118 as described above.

A monitoring agent on the at least one application server 136 injects the identifier in a response to the request (i.e., a UUID-injected response), which response is directed to the at least one EU information handling system 102 along a transmission path that includes that at least one information server 138 and the at least one EU information handling system 102. In this fashion, no modification of application code is required to inject the identifier. Rather, the monitoring agent, which is already being utilized for existing instrumentation of the distributed software application, injects the identifier into the response. The response may be a web response such as, for example, an HTTP response. In various embodiments, the identifier can be injected, for example, into a response header for the response. In some embodiments, the identifier may be inserted into a cookie that is sent as part of the response header. Content of the UUID-injected response is rendered on the at least one EU information handling system 102 via the client application 104.

As noted above, the data collector 108 is situated on the system 100 so that the data collector 108 can observe all network traffic exchanged between the backend-computing system 110 and the EU information handling system 102. Therefore, the data collector 108 is effectively a transparent node along the transmission path. The data collector 108 passively observes the UUID-injected response and uses the identifier to identify EU-experience data that is collected.

The correlator 124 is operable to extract EU-experience data not previously obtained by the correlator (i.e., new EU-experience data) from the EU archive system 126. In various embodiments, the correlator 124 may operate on a periodic basis, on-demand, or in real-time. The correlator 124 is operable to correlate the EU-experience data and the backend-performance data that relates to a same transaction (i.e., a same request and response) by cross-referencing identifiers. In this manner, data resulting from instrumentation (the backend-performance data) and the EU-experience data, which is typically collected without instrumentation, can be correlated. The correlated data can be stored in the at least one database 122. The correlated data can also be used to generate E2E response times for end-use transactions. In addition, on a periodic basis (e.g., every five minutes) or on demand, the correlator 124 may aggregate the correlated data into one or more high-level transaction categories such as, for example, log-in, search, or checkout. Therefore, problems with particular transaction categories can be readily identified and appropriate alerts generated.\

II. Examples of Categorizing EU Transactions

Figure 3:
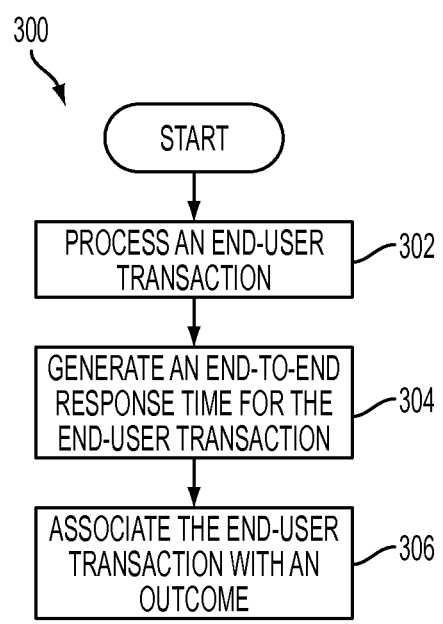
FIG. 3 illustrates an example of a process for determining an acceptability categorization of an end-user transaction.

FIG. 3 illustrates an example of a process 300 for determining an acceptability categorization of an EU transaction. In various embodiments, the process 300 can be performed for each EU transaction handled by a backend-computing system such as the backend-computing system 110. For example, the process 300, in whole or in part, can be implemented by one or more of the monitoring system 118, the correlator 124, the EU archive system 126, the administrative system 140, the reporting module 142, and/or the EU information handling system 102. The process 300 can also be performed generally by the system 100. Although any number of systems, in whole or in part, can implement the process 300, to simplify discussion, the process 300 will be described in relation to specific systems or subsystems of the system 100.

At block 302, the system 100 processes an EU transaction. For example, the block 302 can include tracing the EU transaction as described with respect to FIGS. 1 and 2. At block 304, the monitoring system 118, or another component, generates an E2E response time for the EU transaction. For example, the E2E response time can be based on correlated data as described with respect to FIGS. 1-2. The E2E response time can also be based on backend-performance data and EU-experience data that is correlated in other ways such as, for example, session identifiers, session timing, and/or other information.

At block 306, the monitoring system 118, the reporting module 142, or another component, associates the EU transaction with an outcome. For purposes of this illustration, the outcome is either an acceptable category or an unacceptable category. For example, in certain embodiments, the EU transaction can be associated with the unacceptable category if the E2E response time exceeds a configurable threshold value. Otherwise, the EU transaction can be associated with the acceptable category. The configurable threshold can be an absolute value (e.g., defined in seconds), a relative value (e.g., defined relative to a mean or median value for a transaction type), and/or the like. The configurable threshold can also be varied by type of transaction (e.g., log-in, checkout, etc.). The association can also be stored, for example, in the at least one database 122, a database on the administrative system 140, in memory of the monitoring system 118 and/or the administrative system 140, etc.

III. Examples of Transaction Property Correlation

Figure 4:
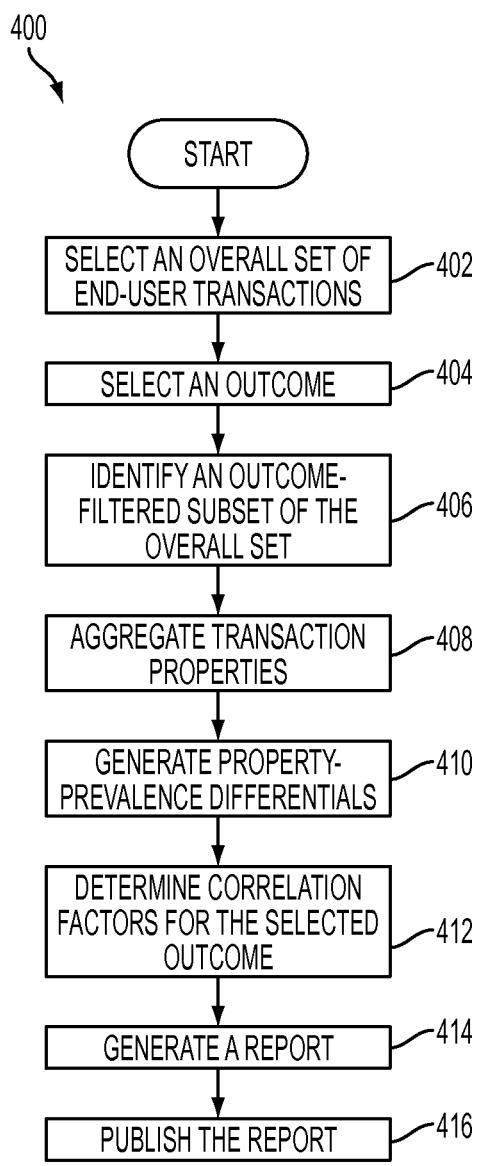
FIG. 4 illustrates an example of a process for correlating transaction properties to a particular outcome.

FIG. 4 illustrates an example of a process 400 for correlating transaction properties to a particular outcome. For example, the process 400, in whole or in part, can be implemented by one or more of the monitoring system 118, the correlator 124, the EU archive system 126, the administrative system 140, the reporting module 142, the property analyzer 144, and/or the EU information handling system 102. The process 400 can also be performed generally by the system 100. Although any number of systems, in whole or in part, can implement the process 400, to simplify discussion, the process 400 will be described in relation to specific systems or subsystems of the system 100.

At block 402, the property analyzer 144 selects an overall set of EU transactions. In various embodiments, the overall set of EU transactions can be any grouping of EU transactions, systematic or arbitrary. In some cases, the overall set of EU transactions can relate to a same application or web application. Each EU transaction of the overall set may be of a same type or a different type. In an example, the overall set can include all checkout transactions over a certain period of time. In another example, the overall set can include a heterogeneous set of transaction types such as, for example, log-in, search, and checkout. In certain embodiments, the overall set can include EU transactions for which a process similar to the process 300 of FIG. 3 has been executed. In some embodiments, the selection of the overall set can be automated. In other embodiments, the selection can be responsive to user input, for example, from an administrative user of an information handling system such as the EU information handling system 102.

At block 404, the property analyzer 144 selects an outcome from among a plurality of potential outcomes. For example, in some embodiments, the plurality of potential outcomes can include the acceptable and unacceptable categorizations described with respect to FIG. 3. In some embodiments, the selection of the outcome can be automated. In other embodiments, the outcome can be pre-specified or hardcoded. In still other embodiments, the selection can be responsive to user input, for example, from an administrative user of an information handling system such as the EU information handling system 102.

At block 406, the property analyzer 144 identifies an outcome-filtered subset of the overall set. In a typical embodiment, the outcome-filtered subset includes those EU transactions of the overall set that are associated with the selected outcome. In an example, a given EU transaction may be associated with the selected outcome as a result of a process similar to the process 300 of FIG. 3. According to this example, each EU transaction of the overall set may be associated with the acceptable category, the unacceptable category, one or more errors, etc.

At block 408, the property analyzer 144 aggregates transaction properties. In some embodiments, the property analyzer 144 may aggregate transaction properties of all transactions in the overall set. In other embodiments, the property analyzer 144 may aggregate transaction properties of transactions in the outcome-filtered subset. Transaction properties can also be aggregated in other fashions such as, for example, through manual specification, access of a pre-specified set of transaction properties, etc. Information or reports generated by the reporting module 142 or a component thereof can be stored in a data store 150.

At block 410, the property analyzer 144 generates a property-prevalence differential for each of the aggregated transaction properties. In a typical embodiment, the block 410 involves measuring a difference between a particular transaction property's prevalence in the outcome-filtered subset and the particular transaction property's prevalence in the overall set. The property-prevalence differential can be indicative of the difference. Consider, for example, a transaction property of city. If ninety percent of transactions in the outcome-filtered subset have the transaction property of New York City but only ten percent of transactions in the overall set have set the transaction property of New York City, the property-prevalence differential could be eighty percent. It should be appreciated that, in various embodiments, the property-prevalence differentials can represent values that are weighted or otherwise manipulated. In some embodiments, the property-prevalence differential can be an absolute value so as to exclude negative values.

At block 412, the property analyzer 144 determines one or more correlation factors for the selected outcome. The one or more correlation factors can be determined from among the aggregated transaction properties. According to the examples described above, a higher property-prevalence differential is generally indicative of a higher correlation with the selected outcome. In some embodiments, a specified number of top transaction properties can be determined to be the one or more correlation factors. The specified number can be automatically selected, input by an administrator or other use, etc. In other embodiments, transaction properties that meet certain criteria can be determined to be the one or more correlation factors. The certain criteria can specify a constraint such as, for example, a minimum property-prevalence differential. The one or more correlation factors can also be determined using a combination of the foregoing and/or in another fashion.

At block 414, the reporting module 142 generates a report of the one or more correlation factors. The report can include the correlation factors, corresponding property-prevalence differentials, and/or other information.

At block 416, the reporting module 142 publishes the report. For example, the report can be transmitted to a system, entity, or user. In some embodiments, the block 416 can include causing the report to be displayed, for example, to an administrative of user of an EU information handling system such as the EU information handling system 102 of FIG. 1. In some embodiments, publishing the report can include transmitting the report to another system for analysis. For example, in some cases, the report can be used to make automatic scaling decisions in a shared-resource environment such as, for example, a cloud environment.

Figure 5:
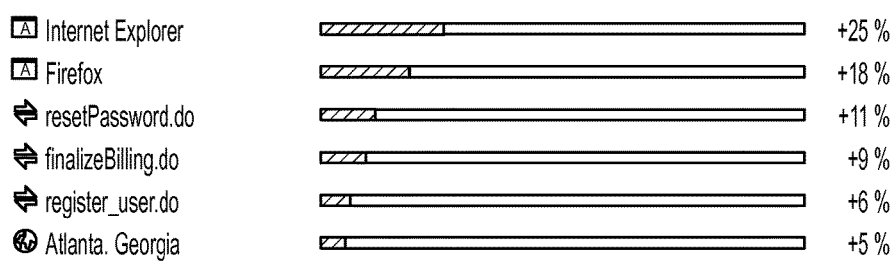
FIG. 5 illustrates an example of a report.
Figure 5:
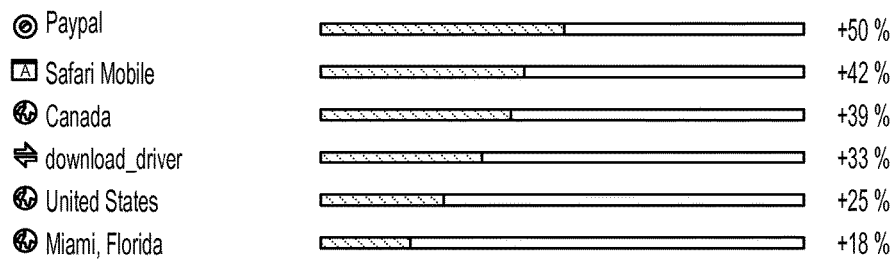

FIG. 5 illustrates an example of a report 500. In various embodiments, the report 500 can be generated as described with respect to the block 414 of FIG. 4 and/or caused to be displayed as described with respect to the block 416 of FIG. 4. As illustrated, the report 500 shows top correlation factors for an outcome of "poor performance," which assessment can correspond to the unacceptable categorization described above, and an outcome of "errors." For each outcome, a list of top correlation factors is shown along with a corresponding property-prevalence differential. In a typical embodiment, the top correlation factors and the property-prevalence differentials of FIG. 5 can result from a process such as, for example, the process 400 of FIG. 4.

Advantageously, in certain embodiments, a report such as the report 500 enables identification and comparison of transaction properties of heterogeneous types. A root cause of a particular outcome can thereby more easily be identified. For example, in the illustration of FIG. 5, the correlation factors include transaction properties related to geographic location, transaction type, and browser, among others. The transaction properties can include properties extracted from backend-performance data, EU-experience data, and/or other data. A process such as the process 400 of FIG. 4 described above can enable cross-comparison of such heterogeneous transaction properties and identification of which transaction properties are most correlative with a particular outcome.

IV. Examples of E2E Response Time Comparison

Figure 6:
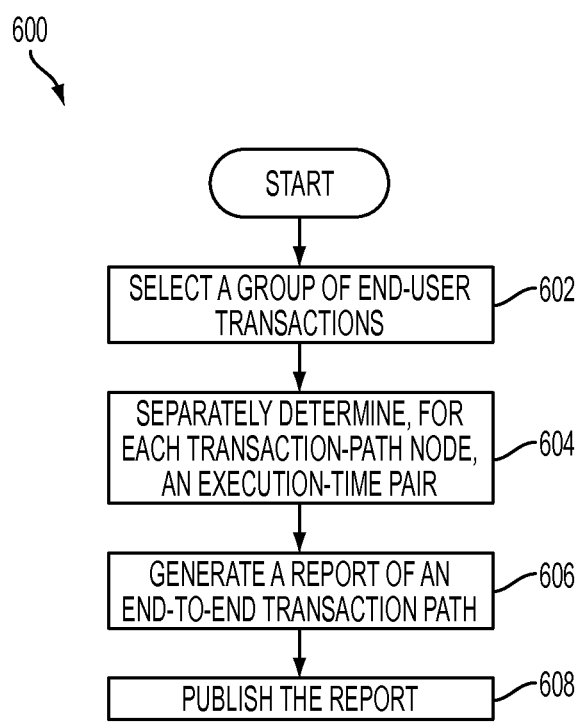
FIG. 6 illustrates an example of a process for comparing end-to-end response-time breakdowns between acceptable and unacceptable transactions.

FIG. 6 illustrates an example of a process 600 for comparing E2E response-time breakdowns between acceptable and unacceptable transactions. For example, the process 600, in whole or in part, can be implemented by one or more of the monitoring system 118, the correlator 124, the EU archive system 126, the administrative system 140, the reporting module 142, the transaction path analyzer 146, and/or the EU information handling system 102. The process 600 can also be performed generally by the system 100. Although any number of systems, in whole or in part, can implement the process 600, to simplify discussion, the process 600 will be described in relation to specific systems or subsystems of the system 100.

At block 602, the transaction path analyzer 146 selects a group of EU transactions that have a common E2E transaction path. For example, the group of transactions can relate to a same application or web application. The E2E transaction path includes a plurality of transaction-path nodes such as, for example, a web browser, a network, a web server, an application server, a database, an external service, and/or the like. Each transaction of the group may be of a same type or a different type. For example, in some embodiments, the selected group may be all checkout transactions over a certain period of time. By way of further example, the selected group can include a heterogeneous set of transaction types such as, for example, log-in, search, and checkout. In certain embodiments, the group of EU transactions can be transactions for which a process similar to the process 300 of FIG. 3 has been executed. In some embodiments, the selection can be automated. In other embodiments, the selection can be responsive to user input, for example, from an administrative user of an information handling system such as the EU information handling system 102.

At block 604, the transaction path analyzer 146 separately determines an execution-time pair for each transaction-path node of the E2E transaction path. In general, the execution-time pair includes two aggregate representations. A first aggregate representation can be indicative of execution time by the transaction-path node of those transactions of the group that are deemed unacceptable transactions. A second aggregate representation can be indicative of execution time by the transaction-path node of those transactions of the group that are deemed acceptable transactions. An example of functionality that can be performed at the block 604 will be described in greater detail with respect to FIG. 7.

At block 606, the reporting module 142 generates a report of the E2E transaction path. The report can be considered a breakdown, across the plurality of transaction-path nodes, of an aggregate E2E response time for the group. In general, the report indicates, or summarizes, each determined execution-time pair in relation to a corresponding transaction-path node. In certain embodiments, the report can be a visualization of the E2E transaction path. In these embodiments, the visualization may depict each determined execution-time pair in relation to the corresponding transaction-path node. In certain other embodiments, the report can be a collection of data representative of each determined execution-time pair and its corresponding transaction-path node.

At block 608, the reporting module 142 publishes the report. For example, the report can be transmitted to a system, entity, or user. In embodiments in which the report is a visualization, the block 608 can include causing the visualization to be displayed, for example, to an administrative of user of an EU information handling system such as the EU information handling system 102 of FIG. 1. In some embodiments, publishing the report can include transmitting the report to another system for analysis. For example, in some cases, the report can be used to make automatic scaling decisions in a shared-resource environment such as, for example, a cloud environment.

Figure 7:
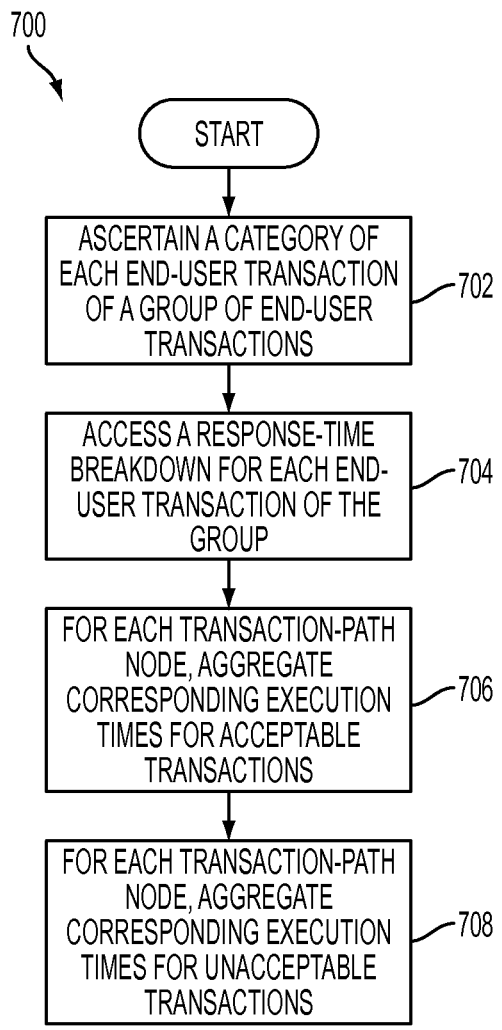
FIG. 7 illustrates an example of a process for separately determining an execution-time pair for each transaction-path node of a transaction path.

FIG. 7 illustrates an example of a process 700 for separately determining an execution-time pair for each transaction-path node of a transaction path. In various embodiments, the process 700 can be performed as all or part of the block 604 of FIG. 6. For example, the process 700, in whole or in part, can be implemented by one or more of the monitoring system 118, the correlator 124, the EU archive system 126, the administrative system 140, the reporting module 142, the transaction path analyzer 146, and/or the EU information handling system 102. The process 700 can also be performed generally by the system 100. Although any number of systems, in whole or in part, can implement the process 700, to simplify discussion, the process 700 will be described in relation to specific systems or subsystems of the system 100.

At block 702, the transaction path analyzer 146 ascertains a category of each EU transaction of a group of EU transactions. The group can be, for example, a group that is selected as described with respect to the block 602 of FIG. 6. In certain embodiments, the category can be one of two categories: an acceptable category and an unacceptable category. Each category can be ascertained, for example, by accessing the at least one database 122 or other memory.

At block 704, the transaction path analyzer 146 accesses a response-time breakdown for each EU transaction of the group. Each response-time breakdown typically includes an execution time for each transaction-path node of the transaction path. At block 706, for each transaction-path node, the transaction path analyzer 146 aggregates corresponding execution times for those EU transactions of the group that are associated with the acceptable category. The aggregation can include computing a mean, median, or mode, performing a statistical analysis, or aggregating in another suitable fashion. At block 708, for each transaction-path node, the transaction path analyzer 146 aggregates corresponding execution times for those EU transactions of the group that are associated with the unacceptable category. The aggregation at the block 706 can be performed in similar fashion to the aggregation at the block 704.

Figure 8:
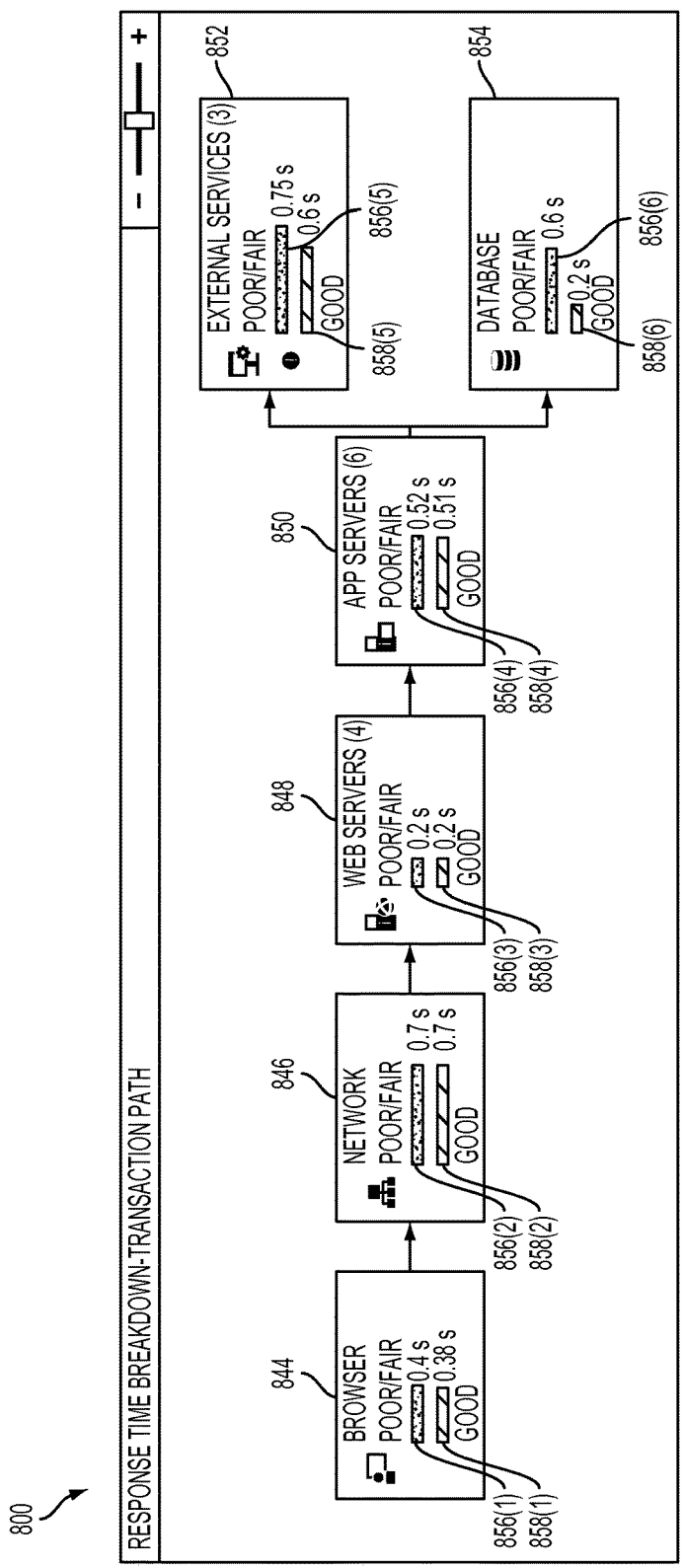
FIG. 8 illustrates an example of a visualization.

FIG. 8 illustrates an example of a visualization 800. In various embodiments, the visualization 800 can be generated as described with respect to the block 606 of FIG. 6 and/or caused to be displayed as described with respect to the block 608 of FIG. 6. As illustrated, the visualization 800 shows a response-time breakdown across a transaction path that includes a browser 844, a network 846, one or more web servers 848, one or more application servers 850, one or more external services 852, and one or more databases 854.

More particularly, the visualization 800 illustrates unacceptable-category aggregate representations 856(1)-856(6) (collectively, unacceptable-category aggregation representations 856) and acceptable-category aggregate representations 858(1)-858(6) (collectively, acceptable-category aggregation representations 858) as described with respect to the block 604 of FIG. 6. The unacceptable-category aggregate representation 856(1) and the acceptable-category aggregate representation 858(1) may be considered an execution-time-pair as described above for the browser 844. As illustrated, each of the network 846, the one or more web servers 848, the one or more application servers 850, the one or more external services 852, and the one or more databases 854 similarly have execution-time pairs.

In a typical embodiment, as depicted in FIG. 8, a visualization of each execution-time pair can be scaled to a highest value contained therein. For example, with respect to the browser 844, a value for the unacceptable-category aggregation representation 856(1) is higher than a value for the acceptable-category aggregate representation 858(1). Therefore, a length of a horizontal bar corresponding to the acceptable-category aggregate representation 858(1) is scaled in proportion to a length of a horizontal bar corresponding to the unacceptable-category aggregate representation 856(1).

In various embodiments, the visualization 800 can facilitate improved root-cause analysis. In the illustrated embodiment, the one or more databases 854 is indicated to have a significant difference in response time between the unacceptable-category aggregation representation 856(6) and the acceptable-category aggregate representation 858(6). In contrast, the browser 844, the network 846, the one or more web servers 848, the one or more application servers 850, and the one or more external services 852 exhibit far less variation in performance between unacceptable transactions and acceptable transactions. For purposes of this example, the one or more databases 854 may be considered a potential root cause of the unacceptable transactions.

It should be appreciated that end-user transactions are described herein only for illustrative purposes. In certain embodiments, various principles described above relative to FIGS. 1-6 can similarly be applied to numerous other types of timed, multi-node transactions. Another example of a timed, multi-node transaction can be database query execution (e.g., execution of SQL queries, NoSQL queries, etc.).

In the case of a database query, certain sources of delay in database-query execution can be considered nodes of a transaction path. Execution time of a database query, or of a group of database queries could be affected by CPU time, input/output operations, lock delay, latch delay, and/or the like. In an example, a given transaction path could include a node for each of CPU time, input/output operations, lock delay, latch delay, and/or the like. According to this example, overall execution time can correspond to an E2E response time as described above. In certain embodiments, a report as described with respect to FIG. 6 can be generated for a group of database-query executions. The report can be generated as described with respect to the block 606 of FIG. 6 and/or published as described with respect to the block 608 of FIG. 6. The group of database-query executions can relate, for example, to a particular database query, a selection of a plurality of database queries, a selection of database queries involving one or more databases, etc. The report can be, for example, a visualization similar to the visualization 800 of FIG. 8.

V. Examples of Determining and Utilizing Event Relevancy

Figure 9:
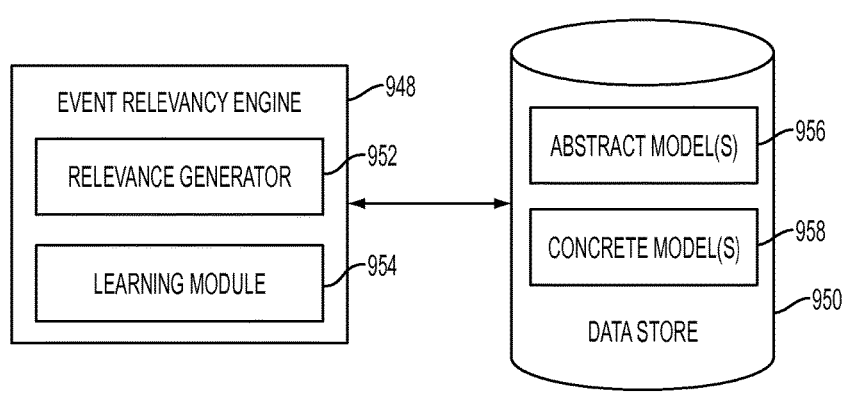
FIG. 9 illustrates example operation of an event relevancy engine.

FIG. 9 illustrates example operation of an event relevancy engine 948. In certain embodiments, the event relevancy engine 948 can be similar to the event relevancy engine 148 of FIG. 1. The event relevancy engine 948 includes a relevancy generator 952 and a learning module 954. As illustrated, the event relevancy engine 948 interacts with a data store 950 that can include an abstract model 956 and a concrete model 958. As described with respect to FIG. 1, the monitoring system 118 can detect or identify one or more events. In a typical embodiment, as described in greater detail below, the event relevancy engine 948 is operable to identify events that are most relevant to a current performance problem such as, for example, an unacceptable E2E response time as described above.

The abstract model 956 is generally a probabilistic graphical model that represents, as objects, a set of monitored-resource types and a set of event types. The monitored-resource types generally correspond to types of resources and components that may form all or part of an E2E transaction path as described above. The set of event types generally correspond to types of performance events that the monitoring system 118 is operable to identify or detect relative to the monitored-resource types.

In certain embodiments, the abstract model 956 can be generated from a dependency topology model as described in U.S. patent application Ser. No. 12/370,399 ("the '399 application"), U.S. patent application Ser. No. 13/658,709 ("the '709 application") and U.S. patent application Ser. No. 13/658,724 ("the '724 application"). The '399 application, the '709 application, and the '724 application are hereby incorporated by reference. For example, the abstract model 956 can be a dependency topology model that is supplemented with edges to connect each topology object (i.e., objects representing each monitored resource type) with alarm types that can be generated by that monitored-resource type. In that way, a given alarm type may be connected to multiple monitored-resource types. An example of the abstract model 956 will be described with respect to FIG. 10.

The concrete model 958 is generally a probabilistic graphical model that represents, as objects, a real-time topology of monitored resources and a set of event types. In general, the real-time topology of monitored resources may be considered instances of the monitored-resource types of the abstract model 956. In a typical embodiment, the set of event types represented in the concrete model 958 generally correspond to the set of event types represented in the abstract model 956. The concrete model 958 can otherwise be structured as described with respect to the abstract model 956. An example of the concrete model 958 will be described with respect to FIG. 11.

In a typical embodiment, the event relevancy engine 948 implements a machine learning algorithm such as, for example, decision tree learning, association rule learning, artificial neural networks, inductive logical programming, support vector machines, clustering, Bayesian networks, reinforcement learning, and/or the like. For illustrative purposes, examples will be described herein in which the event relevancy engine 948 utilizes Bayesian networks. In these embodiments, the abstract model 956 and the concrete model 958 can each be a Bayesian network. Given certain input parameters such as, for example, a problem variable, one or more causal variables and identification of an event type, the relevance generator 952 can use the abstract model 956, the concrete model 958, and E2E response time information to infer a probabilistic relevance of the identified event type. An example will be described with respect to FIG. 12. The learning module 954 can use the inferred probabilistic relevance as an evidence variable with which to train the abstract model 956 and the concrete model 958 according to Bayes' theorem and thereby influence future inferences.

It should be appreciated that, for simplicity of description, the abstract model 956 and the concrete model 958 are described singly above. However, it should be appreciated that, in various embodiments, the abstract model 956 and the concrete model 958 can be representative of more than one abstract model and concrete model, respectively. For example, in certain embodiments, each abstract model such as the abstract model 956 can be paired with a plurality of concrete models such as the concrete model 958. In these embodiments, each paired concrete model could represent real-time monitored resources that are instances of monitored-resource types of the abstract model.

Figure 10:
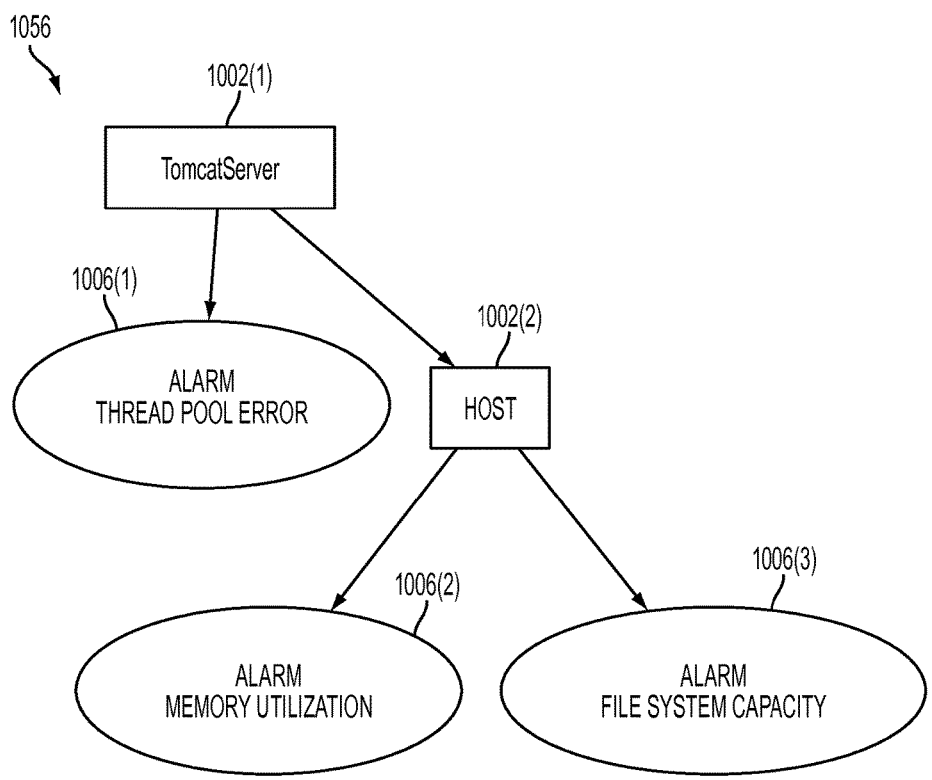
FIG. 10 illustrates a simplified example of an abstract model.

FIG. 10 illustrates a simplified example of an abstract model 1056. The abstract model 1056 includes monitored-resource types 1002(1) and 1002(2) and event types 1006(1), 1006(2), and 1006(3). As illustrated, the monitored-resource type 1002(1) is an application-server type of "TomCatServer" that runs on the monitored-resource type 1002(2) of host. The event type 1006(1) corresponds to a thread-pool-error alarm that the monitoring system 118 may activate under specified conditions with respect to application servers of the monitored-resource type 1002(1). In similar fashion, the event types 1006(2) and 1006(3) correspond to a memory-utilization alarm and a file-system-capacity alarm, respectively, that the monitoring system 118 may be operable to activate under specified conditions with respect to hosts of the monitored-resource type 1002(2).

Figure 11:
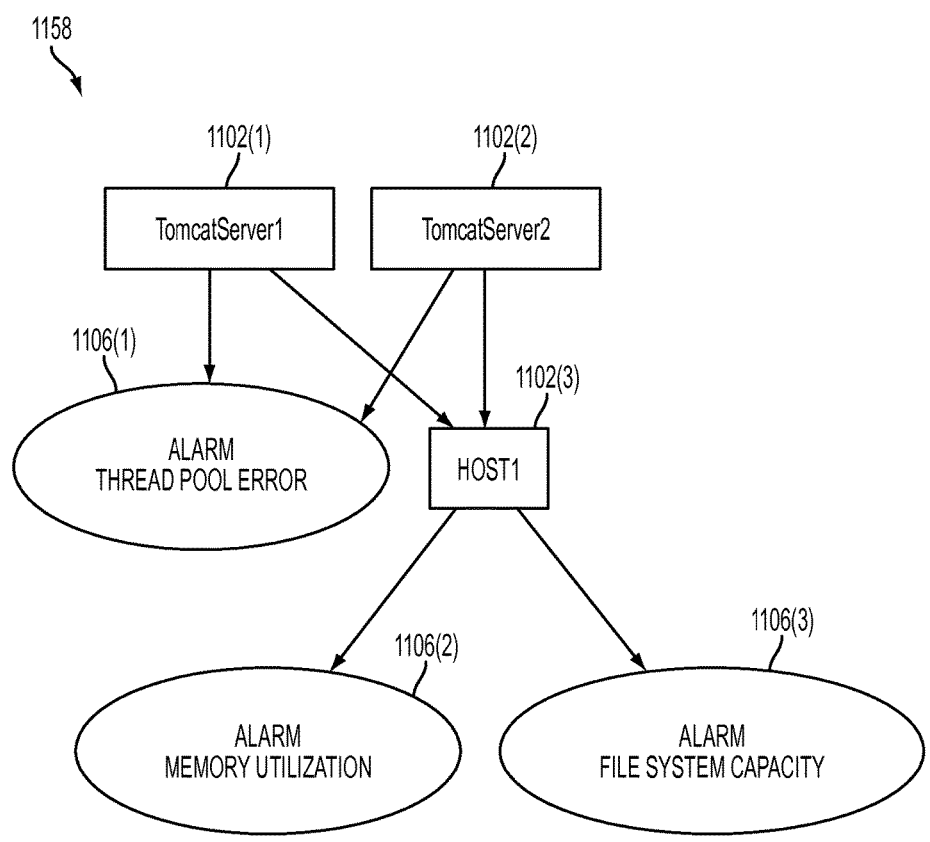
FIG. 11 illustrates a simplified example of a concrete model.

FIG. 11 illustrates a simplified example of a concrete model 1158. The concrete model 1158 includes monitored resources 1102(1) and 1102(2) and event types 1106(1), 1106(2), and 1106(3). For illustrative purposes, the monitored resources 1102(1) and 1102(2) ("TomcatServer1" and "TomcatServer2," respectively) may each be considered instances of the monitored-resource type 1002(1) of FIG. 10. The monitored resource 1102(3) (i.e., "Host1") may be considered an instance of the monitored-resource type 1002(2) of FIG. 1. In that way, the event types 1106(1), 1106(2), and 1106(3) may be considered to correspond to the event types 1006(1), 1006(2), and 1006(3) of FIG. 10.

Figure 12:
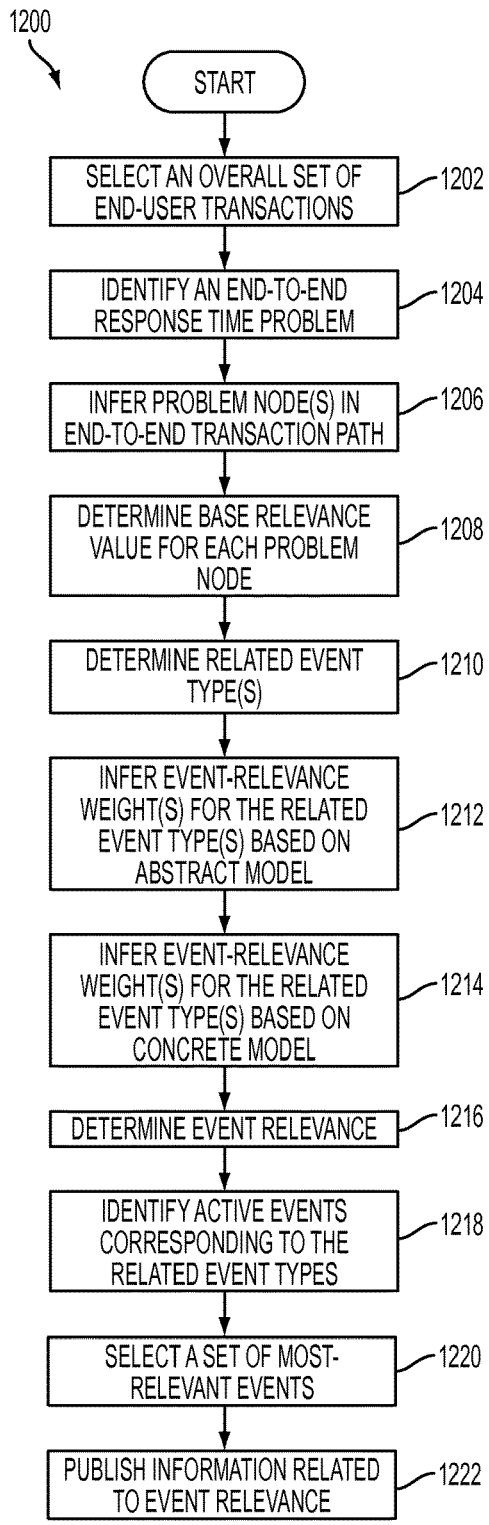
FIG. 12 illustrates an example of a process for identifying most-relevant events.

FIG. 12 illustrates an example of a process 1200 for identifying most-relevant events. For example, the process 1200, in whole or in part, can be implemented by one or more of the monitoring system 118, the correlator 124, the EU archive system 126, the administrative system 140, the reporting module 142, the event relevance engine 148, the event relevance engine 948, the relevance generator 952, the learning module 954, and/or the EU information handling system 102. The process 1200 can also be performed generally by the system 100. Although any number of systems, in whole or in part, can implement the process 1200, to simplify discussion, the process 1200 will be described in relation to specific systems or subsystems of the system 100 and/or the event relevancy engine 948.

At block 1202, the event relevancy engine 948, or another component, selects a group of EU transactions that have a common E2E transaction path. For example, the group of transactions can relate to a same application or web application. The E2E transaction path includes a plurality of transaction-path nodes such as, for example, a web browser, a network, a web server, an application server, a database, an external service, and/or the like. Each transaction of the group may be of a same type or a different type. For example, in some embodiments, the selected group may be all checkout transactions over a certain period of time. By way of further example, the selected group can include a heterogeneous set of transaction types such as, for example, log-in, search, and checkout. In certain embodiments, the group of EU transactions can be transactions for which a process similar to the process 300 of FIG. 3 has been executed. In some embodiments, the selection can be automated. In other embodiments, the selection can be responsive to user input, for example, from an administrative user of an information handling system such as the EU information handling system 102.

At block 1204, the event relevancy engine 948, or another component, identifies an E2E response-time problem. In some embodiments, the process 1200 executes subsequent to a process such as the process 600 of FIG. 6. In these embodiments, the transaction path analyzer 146, or another component, may have already separately determined an execution-time pair for each transaction-path node as described, for example, with respect to block 604 of FIG. 6. In these embodiments, the event relevancy engine 948 can identify an E2E response-time problem, if, for example, an aggregate E2E response time for the group exceeds a threshold value.

At block 1206, the event relevancy engine 948, or another component, infers one or more problem nodes in the E2E transaction path. In an example, the event relevancy engine 948 can calculate a response-time differential for each transaction-path node in the E2E transaction path. For each transaction-path node, the response-time differential can be a difference between the transaction-path node's aggregate or average execution time in unacceptable transactions and the transaction-path node's aggregate or average execute time in acceptable transactions. In some embodiments, the event relevancy engine 948 can infer as a problem node each transaction-path node that has a positive response-time differential. In other embodiments, the event relevancy engine 948 can infer as a problem node only the transaction-path node that has a highest response-time differential. In still other embodiments, the event relevancy engine 948 can infer as problem nodes only those transaction-path nodes whose response-time differentials exceed a configurable threshold. Other variations will be apparent to one skilled in the art after reviewing the present disclosure. Table 1 below illustrates an example response-time-differential calculation with respect to an example application server and an example database server.

TABLE 1

EXAMPLE RESPONSE-TIME DIFFERENTIALS

|  | Aggregate E2E Response Time in Unacceptable Transactions | Aggregate E2E Response Time in Acceptable Transactions | Response-Time Differential |
|---|---|---|---|
| Application Server | 0.6 seconds | 0.3 seconds | 0.3 seconds |
| Database Server | 0.7 seconds | 0.5 seconds | 0.2 seconds |

At block 1208, the relevance generator 952 determines a base relevance value for each problem node. In certain embodiments, the base relevance value leverages what is already known about the E2E response-time problem. In an example, the base relevance value can be a normalized response-time differential. For example, if only a single problem node is inferred at the block 1206 described above, the base relevance value can be one. By way of further example, if more than one problem node is inferred at the block 1206 described above, each problem node's base relevance value can be divided by a highest response-time differential. Table 2 illustrates an example of determining base relevance values using the information from Table 1.

TABLE 2

|  | Response-Time Differential | Base Relevance Value |
|---|---|---|
| Application Server | 0.3 seconds | 1 |
| Database Server | 0.2 seconds | 0.67 |

At block 1210, the relevance generator 952 determines related event types for each of the one or more problem nodes. In various cases, the related event types can be determined from events directly or indirectly connected to the one or more problem nodes in the abstract model 956 and/or the concrete model 958. The related event types can also be determined from other sources such as, for example, the monitoring system 118 of FIG. 1. For example, combining the information from Tables 1-2 with the information from FIGS. 10-11, the related event types for an application server could be a thread-pool-alarm error, a memory-utilization alarm, and a file-system-capacity alarm.

At block 1212, the relevance generator 952 infers event-relevance weights for each of the related event types based on the abstract model 956. In certain embodiments, the relevance generator 952 can utilize certain input parameters such as, for example, one or more problem variables, one or more causal variables and/or other information to produce or infer the event-relevance weights. In an example, for a particular related event type, the one or more problem variables could include an identifier for the identified problem (e.g., that the E2E response time for the group of transactions exceeds a threshold). Continuing the example, for the given related event type, the one or more causal variables could include an identifier for the problem node to which the event type is related (e.g., information sufficient to identify the node in the abstract model 956 that corresponds to the problem node).

At block 1214, the relevance generator 952 infers event-relevance weights for each of the related event types based on the concrete model 958. In a typical embodiment, the relevance generator 952 can utilize input parameters similar in nature to the input parameters described with respect to the abstract model 956 to produce or infer the event-relevance weights.

At block 1216, the relevance generator 952 determines an event relevance of each of the related event types based, at least in part, on the event-relevance weights from the abstract model 956, the event-relevance weights from the concrete model 958, and the base relevance values. In an example, for each related event type, a relevance score can be computed as a product of a corresponding base relevance value, an event-relevance weight inferred via the abstract model 956, and an event-relevance weight inferred via the concrete model 958. An example computation of relevance scores is shown below in Table 3.

TABLE 3

EXAMPLE RELEVANCE SCORES

|  | Example Base Relevance Value (from corresponding problem node) | Example Weight from Abstract Model | Example Weight from Concrete Model | Example Relevance Score |
|---|---|---|---|---|
| Thread-Pool-Error Alarm | 1 (From Application Server) | 0.8 | 0.7 | 0.56 |
| Memory-Utilization Alarm | 1 (From Application Server) | 0.4 | 0.6 | 0.24 |

TABLE 3-continued

EXAMPLE RELEVANCE SCORES

| | Example Base Relevance Value (from corresponding problem node) | Example Weight from Abstract Model | Example Weight from Concrete Model | Example Relevance Score |
|---|---|---|---|---|
| Database-Lock-Error Alarm | 0.67 (From Database Server) | 0.5 | 0.40 | 0.13 |

At block 1218, the relevance generator 952 identifies active (e.g., currently firing) events corresponding to the related event types. At block 1220, the relevance generator 952 selects a set of most-relevant events. In certain embodiments, the most relevant events can be determined by relevance score. For example, if it is desired to select the ten most relevant active events, the ten most relevant active events could be the ten active events with the ten highest event-type relevance scores. The set of most-relevant events can also be selected in other suitable ways. At block 1222, the reporting module 142, or another component, publishes information related to event relevance such as, for example, information related to the set of most-relevant events.

In various embodiments, a learning module such as the learning module 954 can use relevance determinations by the relevance generator 952 to progressively train the abstract model 956 and the concrete model 958. For example, relevance scores such as those described above can be used as evidence values to influence future inferences according to an applicable algorithm such as Bayes' theorem. In addition, in some embodiments, user feedback regarding what the relevance of specific events should be can also be recorded by the event relevancy engine 948 and used as a basis to influence future inferences and/or automatically adjust future relevance scores in a preconfigured fashion.

In certain embodiments, event relevance can also be used as a performance optimization to defer when rules associated with certain events are evaluated. For example, in many cases, rules associated with certain alarms may be computationally expensive to evaluate. In certain embodiments, evaluation of rules associated with these events can be deferred until the events are deemed sufficiently relevant, for example, as a result of reaching at least a threshold level of relevance as determined by the relevance generator 952. In these embodiments, performance can be substantially improved by not constantly or regularly evaluating rules associated with such events. Rather, the evaluation of the rules can be deferred until the threshold level of relevance is determined. A corresponding alarm can be timely activated or triggered at that time.

Figure 13:
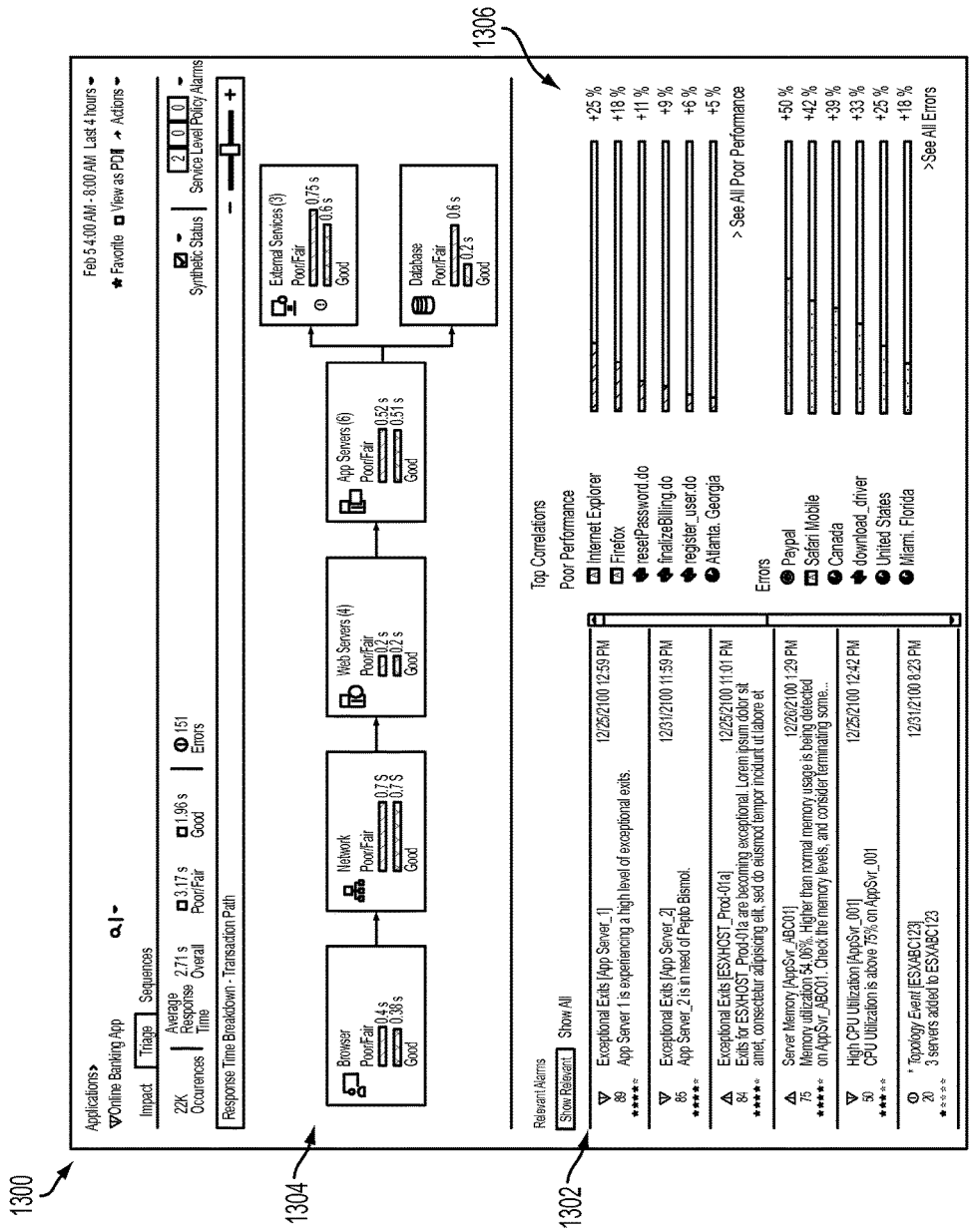
FIG. 13 illustrates an example of a report.

FIG. 13 illustrates an example of a report 1300. In various embodiments, the report 1300 can result from block 1220 of FIG. 12. As shown, the report 1300 includes a most-relevant-alarms display 1302 that can result, for example, from a process such as the process 1200 of FIG. 12. In addition, the report 1300 includes a response-time-breakdown visualization 1304 and a top-correlation-factors display 1306. In various embodiments, the most-relevant-alarms display 1302, the response-time-breakdown visualization 1304, and the top-correlation-factors-display can combine to facilitate prompt and effective troubleshooting of slow transaction performance.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system:
monitoring, in real-time, end-user transactions that pass through an end-to-end transaction path comprising a plurality of transaction-path nodes;
responsive to the monitoring, identifying at least one transaction-path node of the plurality of transaction-path nodes as a problem node based, at least in part, on an analysis of end-to-end response times for a group of the monitored end-user transactions;
determining one or more event types that are related to the at least one transaction-path node based, at least in part, on the one or more event types being at least indirectly connected to the at least one transaction-path node in at least one of an abstract model and a concrete model;
wherein the abstract model comprises a first probabilistic graphical model that represents a set of monitored-resource types, a plurality of event types, and a probabilistic relevance of the monitored-resource types to the plurality of event types, the set of monitored-resource types comprising a monitored-resource type of the at least one transaction-path node, the plurality of event types comprising the one or more event types;
wherein the concrete model comprises a second probabilistic graphical model that represents a real-time topology of monitored resources, the plurality of event types, and a probabilistic relevance of the monitored resources to the plurality of event types such that the monitored resources are instances of the monitored-resource types, the monitored resources comprising the at least one transaction path node;
for each of the one or more event types, inferring a first event-relevance weight from the abstract model;
for each of the one or more event types, inferring a second event-relevance weight from the concrete model;
for each of the one or more event types, determining an event relevance based, at least in part, on the first event-relevance weight and the second event-relevance weight;
identifying a set of currently-firing events that correspond to one or more of the one or more event types;
identifying most-relevant events among the set of currently-firing events based, at least in part, on the determined event relevance; and
publishing the identified most-relevant events to a user to facilitate troubleshooting of the problem node.

2. The method of claim 1, wherein the identifying of the at least one transaction-path node comprises calculating a response-time differential between an execution time by the at least one transaction-path node in deemed unacceptable transactions and an execution time by the at least one transaction-path node in deemed acceptable transactions.

3. The method of claim 2, comprising:
determining a base relevance value for the at least one transaction-path node;
and wherein the determining of the event relevance is based, at least in part, the base relevance value.

4. The method of claim 3, wherein the base relevance value comprises a normalization of the response-time differential.

5. The method of claim 1, comprising selecting the group of transactions, the group having a common end-to-end transaction path comprising a plurality of transaction-path nodes, the plurality of transaction-path nodes comprising the at least one transaction-path node.

6. The method of claim 1, comprising transmitting a report to another system for analysis.

7. The method of claim 1, wherein the abstract model and the concrete model each comprise a Bayesian network.

8. The method of claim 1, comprising deferring evaluation of one or more rules associated with at least one event until the at least one event is determined sufficiently relevant as a result of the determining of the event relevance.

9. The method of claim 1, comprising training the abstract model and the concrete model using a result of the determining of the event relevance.

10. An information handling system comprising:
a processor and memory, wherein the processor and memory in combination are operable to implement a method comprising:
monitoring, in real-time, end-user transactions that pass through an end-to-end transaction path comprising a plurality of transaction-path nodes;
responsive to the monitoring, identifying at least one transaction-path node of the plurality of transaction-path nodes as a problem node based, at least in part, on an analysis of end-to-end response times for a group of the monitored end-user transactions;
determining one or more event types that are related to the at least one transaction-path node based, at least in part, on the one or more event types being at least indirectly connected to the at least one transaction-path node in at least one of an abstract model and a concrete model;
wherein the abstract model comprises a first probabilistic graphical model that represents a set of monitored-resource types, a plurality of event types, and a probabilistic relevance of the monitored-resource types to the plurality of event types, the set of monitored-resource types comprising a monitored-resource type of the at least one transaction-path node, the plurality of event types comprising the one or more event types;
wherein the concrete model comprises a second probabilistic graphical model that represents a real-time topology of monitored resources, a plurality of event types, and a probabilistic relevance of the monitored resources to the plurality of event types such that the monitored resources are instances of the monitored-resource types, the monitored resources comprising the at least one transaction path node;
for each of the one or more event types, inferring a first event-relevance weight from the abstract model;
for each of the one or more event types, inferring a second event-relevance weight from the concrete model;
for each of the one or more event types, determining an event relevance based, at least in part, on the first event-relevance weight and the second event-relevance weight;
identifying a set of currently-firing events that correspond to one or more of the one or more event types;
identifying most-relevant events among the set of currently-firing events based, at least in part, on the determined event relevance; and
publishing the identified most-relevant events to a user to facilitate troubleshooting of the problem node.

11. The information handling system of claim 10, wherein the identifying of the at least one transaction-path node comprises calculating a response-time differential between an execution time by the at least one transaction-path node in deemed unacceptable transactions and an execution time by the at least one transaction-path node in deemed acceptable transactions.

12. The information handling system of claim 11, the method comprising:
determining a base relevance value for the at least one transaction-path node;
and wherein the determining of the event relevance is based, at least in part, the base relevance value.

13. The information handling system of claim 12, wherein the base relevance value comprises a normalization of the response-time differential.

14. The information handling system of claim 10, the method comprising selecting the group of transactions, the group having a common end-to-end transaction path comprising a plurality of transaction-path nodes, the plurality of transaction-path nodes comprising the at least one transaction-path node.

15. The information handling system of claim 10, the method comprising transmitting a report to another system for analysis.

16. The information handling system of claim 10, wherein the abstract model and the concrete model each comprise a Bayesian network.

17. The information handling system of claim 10, the method comprising deferring evaluation of one or more rules associated with at least one event until the at least one event is determined sufficiently relevant as a result of the determining of the event relevance.

18. The information handling system of claim 10, the method comprising training the abstract model and the concrete model using a result of the determining of the event relevance.

19. A computer-program product comprising a non-transitory computer-usable medium having computer-readable program code embodied therein, the computer-readable program code adapted to be executed by a processor to implement a method comprising:
monitoring, in real-time, end-user transactions that pass through an end-to-end transaction path comprising a plurality of transaction-path nodes;
responsive to the monitoring, identifying at least one transaction-path node of the plurality of transaction-path nodes as a problem node based, at least in part, on an analysis of end-to-end response times for a group of the monitored end-user transactions;
determining one or more event types that are related to the at least one transaction-path node based, at least in part, on the one or more event types being at least indirectly connected to the at least one transaction-path node in at least one of an abstract model and a concrete model;
wherein the abstract model comprises a first probabilistic graphical model that represents a set of monitored-resource types, a plurality of event types, and a probabilistic relevance of the monitored-resource types to the plurality of event types, the set of monitored-resource types comprising a monitored-resource type of the at least one transaction-path node, the plurality of event types comprising the one or more event types;
wherein the concrete model comprises a second probabilistic graphical model that represents a real-time topology of monitored resources, a plurality of event types, and a probabilistic relevance of the monitored resources to the plurality of event types such that the monitored resources are instances of the monitored-resource types, the monitored resources comprising the at least one transaction path node;

for each of the one or more event types, inferring a first event-relevance weight from the abstract model;

for each of the one or more event types, inferring a second event-relevance weight from the concrete model;

for each of the one or more event types, determining an event relevance based, at least in part, on the first event-relevance weight and the second event-relevance weight;

identifying a set of currently-firing events that correspond to one or more of the one or more event types;

identifying most-relevant events among the set of currently-firing events based, at least in part, on the determined event relevance; and publishing the identified most-relevant events to a user to facilitate troubleshooting of the problem node.

20. The computer-program product of claim 19, wherein the identifying of the at least one transaction-path node comprises calculating a response-time differential between an execution time by the at least one transaction-path node in deemed unacceptable transactions and an execution time by the at least one transaction-path node in deemed acceptable transactions.

* * * * *